(12) United States Patent
Archer et al.

(10) Patent No.: US 7,779,016 B2
(45) Date of Patent: Aug. 17, 2010

(54) PARALLEL EXECUTION OF OPERATIONS FOR A PARTITIONED BINARY RADIX TREE ON A PARALLEL COMPUTER

(75) Inventors: Charles J. Archer, Rochester, MN (US); Benjamin E. Lynam, Rochester, MN (US); Gary R. Ricard, Chatfield, MN (US)

(73) Assignee: International Business Machines Corporation, Armonk, NY (US)

( * ) Notice: Subject to any disclaimer, the term of this patent is extended or adjusted under 35 U.S.C. 154(b) by 363 days.

(21) Appl. No.: 11/531,846

(22) Filed: Sep. 14, 2006

(65) Prior Publication Data

US 2008/0126739 A1 May 29, 2008

(51) Int. Cl.
*G06F 17/00* (2006.01)
(52) U.S. Cl. .............................. 707/755; 707/999.007; 707/763; 707/764; 707/797
(58) Field of Classification Search ....................... None
See application file for complete search history.

(56) References Cited

U.S. PATENT DOCUMENTS

| | | | |
|---|---|---|---|
| 4,860,201 A | | 8/1989 | Stolfo et al. |
| 4,910,669 A | | 3/1990 | Gorin et al. |
| 5,651,099 A | * | 7/1997 | Konsella ..................... 706/13 |
| 5,826,262 A | * | 10/1998 | Bui et al. ....................... 707/7 |
| 5,826,265 A | * | 10/1998 | Van Huben et al. ............ 707/8 |
| 5,875,190 A | * | 2/1999 | Law ........................ 370/395.42 |
| 6,006,032 A | * | 12/1999 | Blandy et al. ............... 717/127 |
| 6,047,122 A | | 4/2000 | Spiller |
| 6,101,495 A | | 8/2000 | Tsuchida et al. |
| 6,493,637 B1 | * | 12/2002 | Steeg ........................... 702/19 |
| 6,563,823 B1 | * | 5/2003 | Przygienda et al. ......... 370/392 |
| 6,836,480 B2 | * | 12/2004 | Basso et al. .................. 370/390 |
| 6,952,692 B1 | | 10/2005 | Bhattiprolu et al. |
| 7,197,577 B2 | | 3/2007 | Nellitheertha |
| 7,216,217 B2 | * | 5/2007 | Hansen et al. ............... 712/221 |

(Continued)

OTHER PUBLICATIONS

Bershad et al. Spin—An Extensible Microkernel for Application-Specific Operating System Services. ACM SIGOPS Operating System Review. Vol. 29, Issue 1 (Jan. 1995). pp. 74-77.

(Continued)

*Primary Examiner*—Charles Rones
*Assistant Examiner*—Kurt Mueller
(74) *Attorney, Agent, or Firm*—Biggers & Ohanian, LLP

(57) ABSTRACT

Methods, apparatus, and products are disclosed for parallel execution of operations for a partitioned binary radix tree that include: receiving, in a parallel computer, an operational entry for the PBRT, the PBRT comprising a plurality of logical pages that contain a plurality of entries, each logical page included in a tier and containing one or more subentries corresponding to the tier of the logical page containing the subentry, each entry is composed of a subentry from each logical page on an entry path; processing in parallel, on the parallel computer, each logical page in each tier, including: identifying a portion of the operational entry that corresponds to the tier of the logical page, and performing an operation on the logical page in dependence upon the identified portion of the operational entry for the tier; and selecting operation results from the logical pages on the entry path for the operational entry.

18 Claims, 11 Drawing Sheets

U.S. PATENT DOCUMENTS

| | | | | |
|---|---|---|---|---|
| 7,301,541 | B2* | 11/2007 | Hansen et al. | 345/522 |
| 7,673,011 | B2 | 3/2010 | Archer et al. | |
| 2003/0074142 | A1* | 4/2003 | Steeg | 702/19 |
| 2004/0015494 | A1 | 1/2004 | Basso et al. | |
| 2004/0098373 | A1 | 5/2004 | Bayliss et al. | |
| 2005/0060462 | A1 | 3/2005 | Ota | |
| 2005/0182834 | A1 | 8/2005 | Black | |
| 2006/0059196 | A1* | 3/2006 | Sato et al. | 707/104.1 |
| 2006/0292292 | A1* | 12/2006 | Brightman et al. | 427/66 |
| 2007/0016589 | A1 | 1/2007 | Hara et al. | |
| 2008/0126739 | A1 | 5/2008 | Archer et al. | |
| 2008/0148355 | A1 | 6/2008 | Archer et al. | |
| 2008/0313376 | A1 | 12/2008 | Archer et al. | |
| 2008/0313661 | A1 | 12/2008 | Blocksome et al. | |
| 2009/0089328 | A1 | 4/2009 | Miller et al. | |
| 2009/0113308 | A1 | 4/2009 | Almasi et al. | |
| 2009/0138892 | A1 | 5/2009 | Almasi et al. | |

OTHER PUBLICATIONS

Bershad et al. Spin—An Extensible Microkernel for Application-Specific Operating System Services. Technical Report 94-03-03 (Feb. 28, 1994). pp. 1-16. [Retrieved from: http.//www-spin.cs.washington.edu/papers/index.html on Nov. 23, 2009].

Hollingworth, D.: Redmond, T.; Rice, R. Security Policy Realization in an Extensible Operating System. Proceedings of DARPA Information Survivability Conference and Exposition. DISCEX '00 (Jan. 25-27, 2000). vol. 1. pp. 320-334.

"Windows Native Processor Performance Control", Windows Platform Design Notes—Designing Hardware for the Microsoft Windows Family of Operating Systems, Nov. 12, 2002.

Office Action Dated Dec. 10, 2009 in U.S. Appl. No. 11/553,040.

Office Action Dated Oct. 3, 2008 in U.S. Appl. No. 11/531,846.

Final Office Action Dated Mar. 2, 2009 in U.S. Appl. No. 11/531,846.

Office Action Dated Jul. 31, 2009 in U.S. Appl. No. 11/531,846.

Office Action Dated Apr. 29, 2009 in U.S. Appl. No. 11/764,282.

Final Office Action Dated Dec. 8, 2009 in U.S. Appl. No. 11/764,282.

Notice of Allowance Dated Oct. 13, 2009 in U.S. Appl. No. 11/837,015.

Chan, Ernie et al. "Collective Communication on Architectures that Support Simultaneous Communication over Multiple Links", PPoPP'06, Mar. 29-31, 2006, New York, New York, USA, pp. 2-11.

Mao, Weizhen et al. "One-To-All Personalized Communication in Torus Networks", Proceedings of the 25$^{th}$ IASTED International Multi-Conference: parallel and distributed computing networks, Innsbruck, Austria, 2007, pp. 291-296.

Almasi, George et al. "Optimization of MPI Collective Communication on BlueGene/L Systems", ICS'05, Jun. 20-22, 2005, Boston, MA, USA, 2005, pp. 253-262.

* cited by examiner

PARALLEL EXECUTION OF OPERATIONS FOR A PARTITIONED BINARY RADIX TREE ON A PARALLEL COMPUTER

BACKGROUND OF THE INVENTION

1. Field of the Invention

The field of the invention is data processing, or, more specifically, methods, apparatus, and products for parallel execution of operations for a partitioned binary radix tree on a parallel computer.

2. Description of Related Art

A database is an aggregation of data that has an organized structure in the memory of a computer system. Data in a database is often organized using an index, which is a tree data structure that defines the organization of data in memory in such a way so as to allow for fast searching and dynamic sorting of the data. A database typically includes data structures, called 'tables,' that contain records and includes the indexes that define how the records can be accessed by the computer system. Each record includes a key that identifies the record and is capable of being searched for and sorted on. An index provides a logical ordered list of the records in a database by storing key values in the records as entries in the tree data structure implementing the index. A computer system may use the index to facilitate fast searching for a record that has a particular key by looking up the key in the sorted entries of the tree data structure implementing the index.

A tree data structure is typically composed of a plurality of nodes logically connected in a manner that resembles an inverted tree. In many tree data structures, the key values or entries in the tree are stored in the various nodes of the tree. Leaf nodes are nodes in the tree that have no children. By contrast, the root node of the tree is a node in the tree that has no parent. Nodes logically positioned between the root node and the leaf nodes are referred to as limb nodes and have both a parent and a child.

Because tree data structures often store large quantities of data, maintaining an entire tree in a computer system's primary storage is typically unfeasible or impractical. Tree data structures, therefore, are generally partitioned into logical pages. Each logical page is blocks of data that store a sub tree of the nodes in tree data structure. In computer systems that cannot store the entire tree in primary storage, the logical pages are paged as a unit between primary and secondary storage as needed by the computer system. In partitioning a tree, the goal is to minimize the amount of data that must be paged to locate a particular key, thus increasing system performance. The trunk page is the first, or topmost, logical page of a tree. The leaf pages are the bottom-most logical pages in the tree. The limb pages are logical pages between the leaf pages and the trunk page.

Many databases implement indexes using a particular type of tree data structure called a partitioned binary radix tree ('PBRT'). PBRTs provide a space advantage over many other types of tree data structures because PBRTs only store the leading characters common to multiple entries once in the PBRT. PBRTs are able to store common leading characters only once by encoding the leading characters into the logical connections among the nodes that lead from the root node of the tree to a leaf node pointing to the unique trailing characters of a particular entry. The entries of a PBRT, therefore, are distributed throughout the nodes of the tree instead of being stored in their entirety within a single node.

Because the entries of a PBRT are distributed throughout the tree, searching algorithms in the current art are performed in sequential order from the trunk page to the leaf pages of the PBRT. Such sequential algorithms, however, do not take advantage of the computing resources available using parallel computing. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination. Because current searching algorithms for PBRTs do not take advantage of the computing resources available using parallel computing, room for improvement exists in the current art.

SUMMARY OF THE INVENTION

Methods, apparatus, and products are disclosed for parallel execution of operations for a partitioned binary radix tree on a parallel computer that include: receiving, in the parallel computer, an operational entry for the PBRT, the PBRT comprising a plurality of logical pages that contain a plurality of entries in the PBRT, each logical page included in a tier of the PBRT and containing one or more subentries represented by a plurality of radix nodes organized as a sub tree on the logical page, each subentry is a portion of an entry that corresponds to the tier of the logical page containing the subentry, each entry in the PBRT is composed of a subentry from each logical page on an entry path for the entry; processing in parallel, on the parallel computer, each logical page in each tier of the PBRT, including: identifying a portion of the operational entry that corresponds to the tier of the logical page, and performing an operation on the logical page in dependence upon the identified portion of the operational entry for the tier; and selecting operation results from the logical pages on the entry path for the operational entry.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
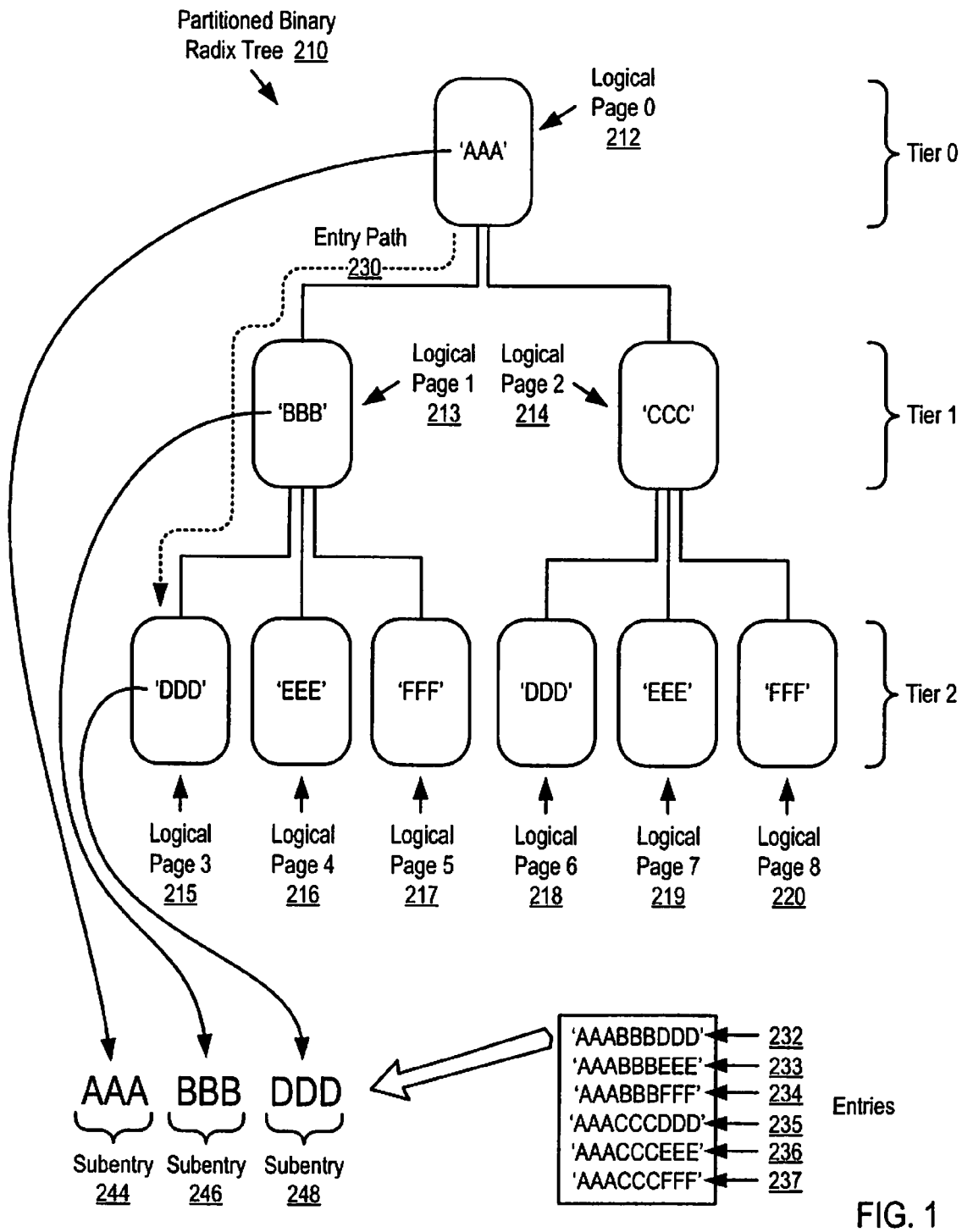
FIG. 1 sets forth a line drawing illustrating an exemplary partitioned binary radix tree useful in parallel execution of operations for a partitioned binary radix tree on a parallel computer according to embodiments of the present invention.

Exemplary methods, apparatus, and products for parallel execution of operations for a partitioned binary radix tree on a parallel computer according to embodiments of the present invention are described with reference to the accompanying drawings, beginning with FIG. 1. FIG. 1 sets forth a line drawing illustrating an exemplary partitioned binary radix tree ('PBRT') (210) useful in parallel execution of operations for a partitioned binary radix tree on a parallel computer according to embodiments of the present invention. The exemplary PBRT (210) of FIG. 1 is a tree data structure in which common leading characters of entries in the tree are represented by the logical connections among the nodes in the tree. In this way, an entry in the PBRT (210) is distributed throughout the nodes of a tree. When the nodes of a PBRT are contained on more than one logical page, an entry in the PBRT is also distributed across multiple logical pages.

In the example of FIG. 1, the PBRT (210) includes a plurality of logical pages (212-220) that contain a plurality of entries (232-237) in the PBRT (210). An entry in a PBRT is an array of bits that typically represent a string of characters. Often the string of characters serves as a key value to data in a database. Entries may represent, for example, an IP network address, a unique identifier for a record in a database, or any other array of characters as will occur to those of skill in the art. In the example of FIG. 1, the logical pages (212-220) are connected together using solid lines that represent logical connections between the pages. Logical connections may be implemented using, for example, pointers and back pointers.

In the exemplary PBRT (210) of FIG. 1, each logical page (212-220) is included in a tier of the PBRT (210). Each tier specifies the level of a logical page in the PBRT relative to the root logical page. For example, the logical pages included in 'Tier 1' are one level below the root logical page; the logical pages included in 'Tier 2' are two level below the root logical page; and so on. As mentioned above, the root logical page is the logical page in a tree that has no parent. In the example of FIG. 1, the root logical page (212) is included in 'Tier 0,' logical pages (213-214) are included in 'Tier 1,' and logical pages (215-220) are included in 'Tier 2.'

In addition to specifying the level of a logical page, each tier corresponds with a portion of the entries contained in the PBRT (210). A portion of an entry is a group of consecutive bits in the entry that are represented by the logical connections among the nodes of the logical pages on a particular tier. In the example of FIG. 1, 'Tier 0' corresponds with the group of bits representing the first set of three characters of each entry in the PBRT (210). 'Tier 1' corresponds with the group of bits representing the second set of three characters of each entry in the PBRT (210). 'Tier 2' corresponds with the group of bits representing the third set of three characters of each entry in the PBRT (210).

Each logical page (212-220) of FIG. 1 contains one or more subentries. A subentry is a portion of an entry that corresponds to the tier of the logical page containing the subentry. Consider, for example, the entry (232) of 'AAABBBDDD' contained in the exemplary PBRT (210). As mentioned above, the first set of three characters corresponds to 'Tier 0.' Accordingly, the subentry (244) 'AAA' of the entry 'AAABBBDDD' is contained in logical page 0 (212) included in 'Tier 0.' The second set of three characters corresponds to 'Tier 1.' Accordingly, the subentry (246) 'BBB' of the entry 'AAABBBDDD' is contained in logical page 1 (213) included in 'Tier 1.' The third set of three characters corresponds to 'Tier 2.' Accordingly, the subentry (248) 'DDD' of the entry 'AAABBBDDD' is contained in logical page 1 (215) included in 'Tier 2.'

In the example of FIG. 1, each entry (232-237) in the PBRT (210) is composed of a subentry from each logical page on an entry path for the entry. The entry (232) of 'AAABBBDDD' in FIG. 1, for example, is composed of subentries (244, 246, 248) on an entry path (230) for entry (232). An entry path is the chain of logical connections among radix nodes of a set of logical pages that represent an entry in the PBRT. A logical page is referred to as 'on an entry path for an entry' when the logical page contains some of the radix nodes logically connected to represent an entry in the PBRT. Consider, for example, the entry (235) of 'AAACCCDDD' contained in the PBRT (210). The entry path in the exemplary PBRT (210) for 'AAACCCDDD' is the chain of logical connections of radix nodes on the logical pages (212, 214, 218). Logical pages (212, 214, 218), therefore, are said to be on the entry path of the entry (235) of 'AAACCCDDD.'

In the example of FIG. 1, each logical page (212-220) includes a plurality of radix nodes organized as a sub tree (not shown). Radix nodes are data structures that are logically connected together to represent information in the PBRT. Radix nodes and their ability to represent information in the PBRT are further discussed below with reference to FIG. 2.

Parallel execution of operations for a partitioned binary radix tree on a parallel computer according to embodiments of the present invention may be carried out using the exemplary PBRT (210) of FIG. 1. Parallel execution of operations for a partitioned binary radix tree on a parallel computer according to embodiments of the present invention includes: receiving, in the parallel computer, an operational entry for the PBRT; processing in parallel, on the parallel computer, each logical page in each tier of the PBRT, including: identifying a portion of the operational entry that corresponds to the tier of the logical page, and performing an operation on the logical page in dependence upon the identified portion of the operational entry for the tier; and selecting operation results from the logical pages on the entry path for the operational entry.

As mentioned above, each logical page in the PBRT includes radix nodes organized as a sub tree that represents information in the PBRT. For further explanation, therefore, FIG. 2 sets forth a line drawing illustrating an exemplary logical page (212) that includes a plurality of radix nodes (252-266) organized as a sub tree useful for parallel execution of operations for a partitioned binary radix tree on a parallel computer according to embodiments of the present invention.

Figure 2:
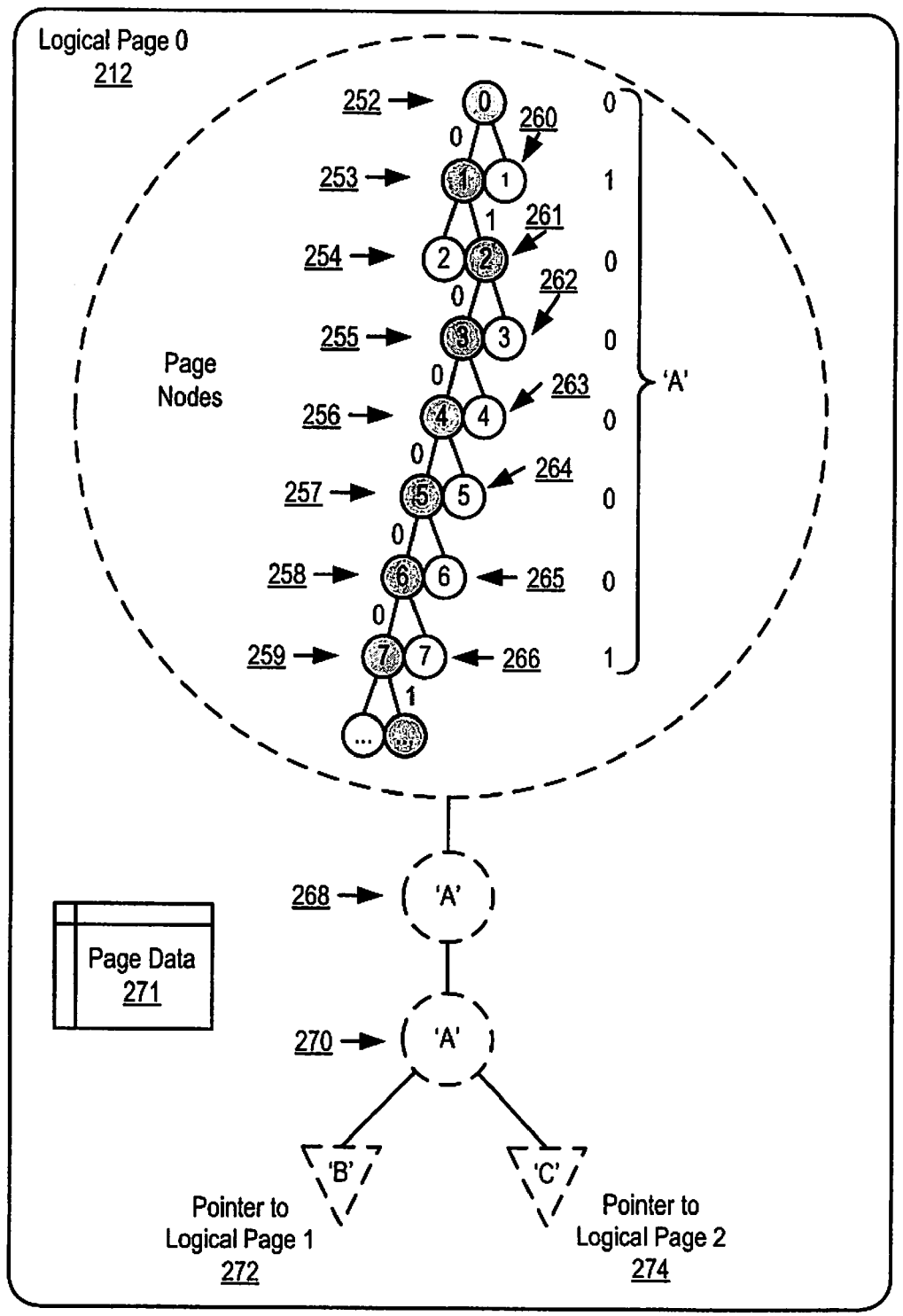
FIG. 2 sets forth a line drawing illustrating an exemplary logical page that includes a plurality of radix nodes organized as a sub tree useful for parallel execution of operations for a partitioned binary radix tree on a parallel computer according to embodiments of the present invention.

Each radix node (252-266) of FIG. 2 contains forward and backward linkage information. For example, the radix node (252) of FIG. 2 contains a pointer to the cluster of nodes formed by radix nodes (253, 260). A cluster is a group of radix nodes logically connected to the same parent radix node. Although clusters in binary radix trees are composed of two radix nodes, the clusters of other types of radix trees may contain more than two radix nodes. For example, clusters of a quad-radix tree are composed of four radix nodes. Returning to the example of radix node (252) in FIG. 2, radix nodes (253, 260) form a cluster with respect to radix node (252) because both radix node (253) and radix node (260) are logically connected to radix node (252). That is, when traversing through the radix nodes (252-266) of logical page 0 (212), either the radix node (253) or the radix node (260) may be selected for traversal from the radix node (252).

To determine which radix node of a cluster is selected for traversal, each radix node (252-266) of FIG. 2 includes a compare bit that specifies the particular bit in an array of bits whose value is represented by the logical connections of the radix node. A left logical connection down the sub tree represents a value of '0,' and a right logical connection down the sub tree represents a value of '1.' In the example of FIG. 2, the integer inside each radix node (252-266) represents the value of the compare bit for the particular radix node. For example, radix node (252) has a value of '0' for the compare bit. The left logical connection from radix node (252) to radix node (253) represents a value of '0' for the first bit in an array of bits. The right logical connection from radix node (252) to radix node (260) represents a value of '1' for the first bit in an array of bits. Continuing with the example, radix node (253) has a value of '1' for the compare bit. The left logical connection from radix node (253) to radix node (254), therefore, represents a value of '0' for the second bit in an array of bits. The right logical connection from radix node (253) to radix node (261) represents a value of '1' for the second bit in an array of bits. Still continuing with the example, radix node (261) has a value of '2' for the compare bit. The left logical connection from radix node (261) to radix node (255), therefore, represents a value of '0' for the third bit in an array of bits. The right logical connection from radix node (261) to radix node (262) represents a value of '1' for the third bit in an array of bits, and so on down the tree. In this manner, information can be represented by the plurality of radix nodes organized in a sub tree through the logical connections established between radix nodes. In particular, a plurality of radix nodes included in a logical page may represent subentries contained on the logical page. In the example of FIG. 2, the logical connections among radix nodes (252-266) store a value '01000001'—the binary representation of the first character 'A' in the subentry 'AAA' contained in logical page 0 (212). The radix nodes (252-266) used to store '01000001' are represented in FIG. 2 with shading. Similarly, other radix nodes included in the logical page 0 (212) represent the second character 'A' (268) and third character 'A' (270) in the subentry 'AAA.' Although FIG. 2 depicts the logical connections among the nodes on the entry path for the character 'A,' readers will note that other logical connections formed using sub trees from radix nodes (260, 254, 262-266) may also exist.

Because information contained in a logical page is represented in the logical connections between radix nodes of the logical page, searching for information in a logical page of a PBRT is merely a matter of traversing through the radix nodes of the logical page to identify whether the corresponding logical connections exist. Consider, for example, searching the logical page 0 (212) to determine whether the array of bits '0001' is represented by the radix nodes of the logical page 0 (212). As mentioned above, a left logical connection down the sub tree corresponds to a value of '0,' and a right logical connection down the sub tree corresponds to a value of '1.' Starting at the root radix node (252), the first bit '0' of the bit array '0001' specifies selecting the left logical connection from radix node (252) to radix node (253). A check is made to determine whether radix node (253) is a terminating node, thus indicating that no logical connections down the sub tree to other radix nodes exist. Encountering a terminating node before the end of the search array indicates that the array is not contained in the logical page because the logical connections among the radix nodes of the logical page do not represent the array. In our example, however, radix node (253) is not a termination node because connections to nodes (254, 261) exist. Thus, the search continues. The second bit '0' of the bit array '0001' specifies selecting the left logical connection from radix node (253) to radix node (254). The radix node (254), however, is a termination node because there are no logical connections down the sub tree from radix node (254) to other radix nodes. The array of bits '0001,' therefore, is not contained in the tree.

As mentioned above, each logical page in a PBRT includes a sub tree of radix nodes in the PBRT used to represent one or more subentries. In the example of FIG. 2, logical page 0 (212) contains subentry 'AAA' corresponding to the first portion of the various entries described above with reference to FIG. 1. To represent the entire entries in the PBRT, the logical pages are logically connected using linking information such as, for example, pointers. To indicate that the remaining portions of the entries reside on other logical pages on lower tiers of the PBRT, the lowest levels in the sub tree of logical page 0 (212) of FIG. 2 include pointers (272, 274) to the root radix node of other logical pages of a PBRT. If the portion of the entry that corresponds to 'Tier 1' begins with the character 'B,' then the pointer (272) to the logical page 1 continues the path of the entry through the radix nodes of logical page 1. If the portion of the entry that corresponds to 'Tier 1' begins with the character 'C,' then the pointer (274) to the logical page 2 continues the path of the entry through the radix nodes of logical page 2.

In addition to the radix nodes representing subentries, the logical page 0 (212) of FIG. 2 also includes page data (271). The page data (271) represents data that describes the logical page 0 (212) and its relationship to the rest of the PBRT. For example, the page data (271) may include the amount of free space in the logical page 0 (212), the tier of the PBRT in which the logical page 0 (212) is included, the number of bits in an entry of the PBRT represented by the logical pages in the PBRT on tiers above the logical page 0 (212), or any other data as will occur to those of skill in the art.

Figure 3:
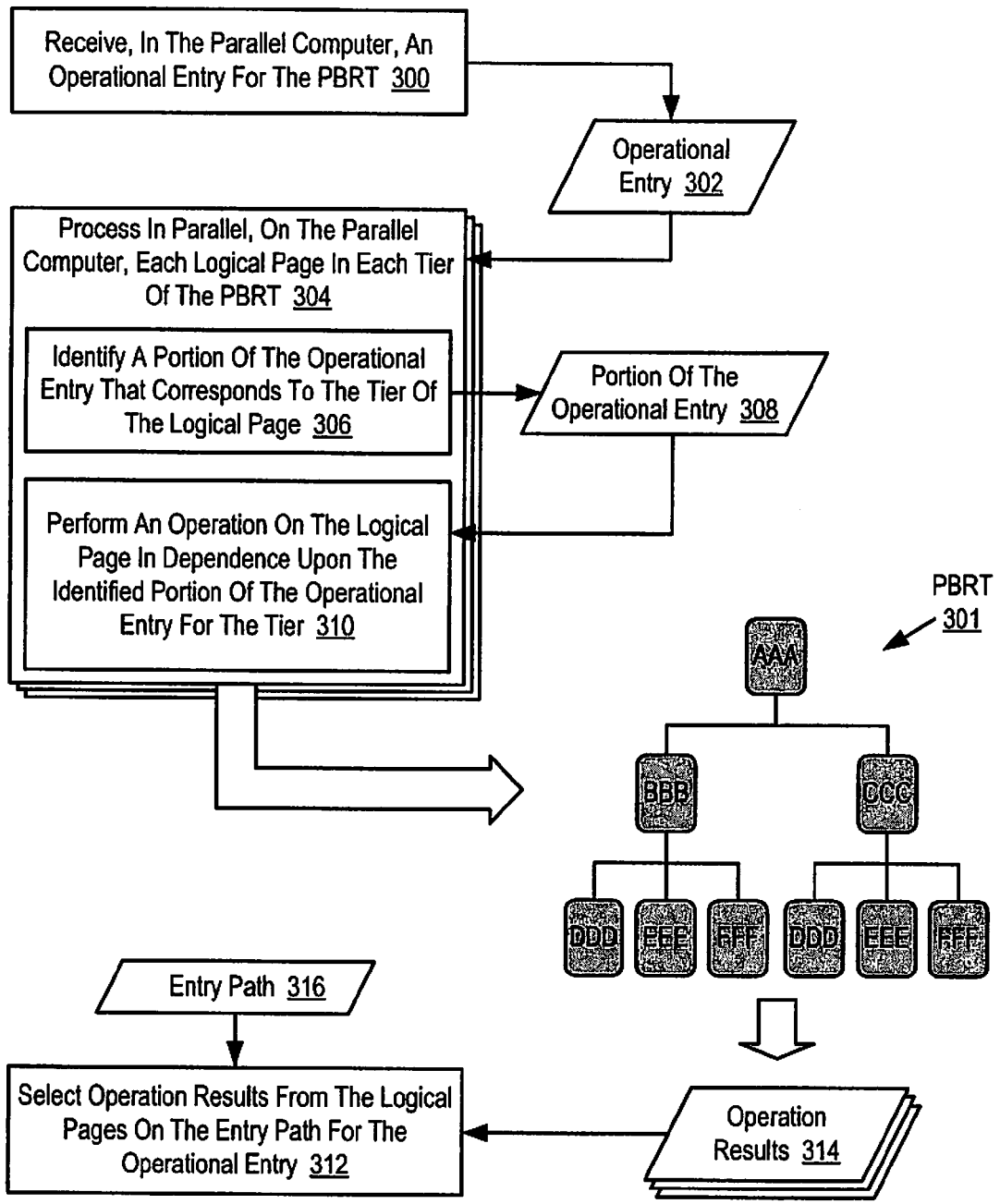
FIG. 3 sets forth a flow chart illustrating an exemplary method for parallel execution of operations for a partitioned binary radix tree on a parallel computer according to embodiments of the present invention.

For further explanation, FIG. 3 sets forth a flow chart illustrating an exemplary method for parallel execution of operations for a partitioned binary radix tree ('PBRT') (301) on a parallel computer according to embodiments of the present invention. The PBRT (301) includes a plurality of logical pages that contain a plurality of entries in the PBRT (301). Each logical page of the PBRT (301) is included in a tier of the PBRT (301) and contains one or more subentries represented by a plurality of radix nodes organized as a sub tree on the logical page. Each subentry is a portion of an entry that corresponds to the tier of the logical page containing the subentry. Each entry in the PBRT (301) is composed of a subentry from each logical page on an entry path for the entry.

The method of FIG. 3 includes receiving (300), in a parallel computer, an operational entry (302) for the PBRT (301). The operation entry (302) of FIG. 3 represents an array of bits used by a parallel operation for the PBRT (301). The operation entry (302) may represent, for example, an IP network address, a unique identifier for a record in a database, a string of characters, or any other information as will occur to those of skill in the art. Operations that use the operational entry (302) may include, for example, searching the PBRT (301) for a particular entry that matches the operational entry (302), inserting the operational entry (302) into the PBRT (301), or deleting the operational entry (302) entry from the PBRT (301).

The method of FIG. 3 also includes processing (304) in parallel, on the parallel computer, each logical page in each tier of the PBRT (301). Processing (304) in parallel, on the parallel computer, each logical page in each tier of the PBRT (301) according to the method of FIG. 3 may be carried out by configuring each logical page of the PBRT on a different memory partition of computer memory in the parallel computer and mapping a different computer processor of the parallel computer to each memory partition for processing each logical page.

In the method of FIG. 3, processing (304) in parallel, on the parallel computer, each logical page in each tier of the PBRT (301) includes identifying (306) a portion (308) of the operational entry that corresponds to the tier of the logical page. The portion (308) of the operational entry that corresponds to the tier of the logical page is the group of consecutive bits in the operation entry (302) whose values are represented by the logical connections of the radix nodes included in the logical pages of a particular tier. Using the exemplary PBRT (301) from FIG. 3 as an example: the portion (308) of the operational entry that corresponds to the top tier is the group of consecutive bits that represent the first set of three characters of each entry in the PBRT (301); the portion (308) of the operational entry that corresponds to the middle tier is the group of consecutive bits that represent the second set of three characters of each entry in the PBRT (301); and the portion (308) of the operational entry that corresponds to the bottom tier is the group of consecutive bits that represent the third set of three characters of each entry in the PBRT (301).

Identifying (306) a portion (308) of the operational entry that corresponds to the tier of the logical page according to the method of FIG. 3 may be carried out by selecting the most significant bit of the portion of the operational entry (302) that corresponds to the tier of the logical page. As mentioned above, logical pages typically include page data that describe the logical pages and their relationship to the rest of the PBRT. Page data for each logical page may include the number of bits in an entry of the PBRT represented in logical pages in the PBRT on tiers above the logical page. Selecting the most significant bit of the portion of the operational entry (302) that corresponds to the tier of the logical page, therefore, may be carried out by retrieving the number of bits in an entry of the PBRT represented by logical pages in higher tiers of the PBRT above the logical page and selecting the bit in the operational entry (302) that is offset from the most significant bit of the operation entry (302) by the retrieved number of bits.

In the method of FIG. 3, processing (304) in parallel, on the parallel computer, each logical page in each tier of the PBRT (301) also includes performing (310) an operation on the logical page in dependence upon the identified portion (308) of the operational entry for the tier. Performing (310) an operation on the logical page in dependence upon the identified portion (308) of the operational entry for the tier is carried out in parallel on each logical page of the PBRT (301) and is indicated in the exemplary PBRT (301) of FIG. 3 by the gray shading of each logical page. In the method of FIG. 3, performing (310) an operation on the logical page in dependence upon the identified portion (308) of the operational entry for the tier may be carried out by searching the logical page for a subentry that matches the identified portion of the operational entry for the tier by traversing the radix nodes of the logical page, inserting into the logical page a subentry that matches the identified portion of the operational entry for the tier by modifying logical connections among radix nodes of the logical page, and deleting from the logical page a subentry that matches the identified portion of the operational entry for the tier by modifying logical connections among radix nodes of the logical page if the subentry that matches the identified portion of the operational entry for the tier is not comprised in more than one entry of the PBRT as discussed below with reference to FIGS. 4, 5, and 6.

The method of FIG. 3 includes selecting (312) operation results (314) from the logical pages on the entry path for the operational entry. As mentioned above, the logical pages on the entry path (316) for the operational entry are the logical pages that contain the radix nodes logically connected to represent the operational entry (302) in the PBRT. The operation results (314) represent the results returned for each logical page in the PBRT (301) from an operation performed in parallel on the PBRT (301). The operation results (314) may include, for example, an indication whether a particular logical page contains a portion (308) of the operational entry, an indication whether an insertion or deletion operation was successful for a particular logical page, or any other results returned for each logical page as will occur to those of skill in the art.

Selecting (312) operation results (314) from the logical pages on the entry path (316) for the operational entry (302) according to the method of FIG. 3 may be carried out by receiving, in each processor mapped to a logical page of the PBRT (301), operation results for the child logical page on the entry path (316), combining the received operation results with the operation results for the processor's logical page, and passing the combined operation results to the processor for the parent logical page. Because each logical page of the PBRT (301) contains a pointer on the path of entry to any logical page that may contain any remainder of the operational entry, a processor for each logical page knows from which of one or more child logical pages to receive results that are on the path of entry for the operational entry. Receiving operation results for the child logical page on the entry path (316), therefore, may include waiting for the operation results for the child logical page on the entry path (316) and discarding the operation results received for other child logical pages. Receiving operation results for the child logical page on the entry path (316) may also include receiving the operation results for the child logical page on the entry path (316) and terminating the operation on the other child logical pages. Instead of waiting to receive the operation results, receiving operation results for the child logical page on the entry path (316) may also include polling for the operation results for the child logical page on the entry path (316).

As the operation results (314) are combined and passed to the processors for the logical pages in higher tiers of the PBRT, the operation results (314) for the logical pages on the entry path for the operational entry are aggregated in the processor for the root logical page. Selecting (312) operation results (314) from the logical pages on the entry path for the operational entry may, therefore, be carried out by receiving the operation results (314) in the processor for the root logical page. In the method of FIG. 3, selecting (312) operation results (314) from the logical pages on the entry path for the operational entry may be further carried out by selecting, from the logical pages having a subentry that matches the identified portion of the operational entry, search results from the logical pages on the entry path for the operational entry, discarding insertions into the logical pages not on the entry path for the operational entry, and discarding deletions from the logical pages not on the entry path for the operational entry as discussed below with reference to FIGS. 4, 5, and 6.

As mentioned above, performing an operation on the logical page in dependence upon the identified portion of the operational entry for the tier may be carried out by searching the logical page for a subentry that matches the identified portion of the operational entry for the tier by traversing the radix nodes of the logical page. For further explanation, therefore, FIG. 4 sets forth a flow chart illustrating a further exemplary method for parallel execution of operations for a partitioned binary radix tree (401) on a parallel computer according to embodiments of the present invention that includes searching (400) the logical page for a subentry that matches the identified portion of the operational entry for the tier by traversing the radix nodes of the logical page.

Figure 4:
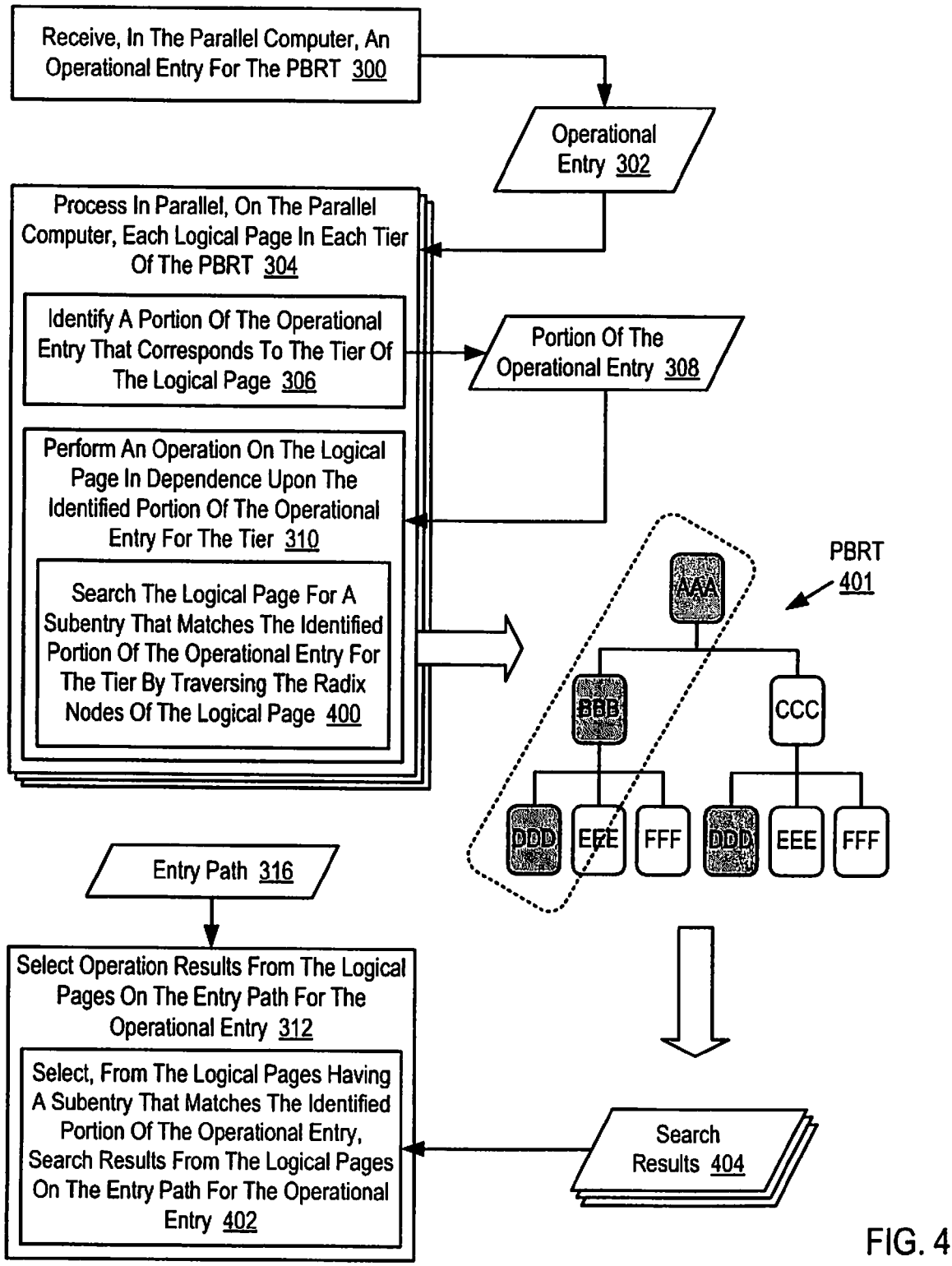
FIG. 4 sets forth a flow chart illustrating a further exemplary method for parallel execution of operations for a partitioned binary radix tree on a parallel computer according to embodiments of the present invention.

In the example of FIG. 4, the PBRT (401) includes a plurality of logical pages that contain a plurality of entries in the PBRT (401). Each logical page of the PBRT (401) is included in a tier of the PBRT (401) and contains one or more subentries represented by a plurality of radix nodes organized as a sub tree on the logical page. Each subentry is a portion of an entry that corresponds to the tier of the logical page containing the subentry. Each entry in the PBRT (401) is composed of a subentry from each logical page on an entry path for the entry.

The method of FIG. 4 is similar to the method of FIG. 3. That is, the method of FIG. 4 is similar to the method of FIG. 3 in that the method of FIG. 4 includes: receiving (300), in the parallel computer, an operational entry (302) for the PBRT (401); processing (304) in parallel, on a parallel computer, each logical page in each tier of the PBRT (401), including: identifying (306) a portion (308) of the operational entry that corresponds to the tier of the logical page, and performing (310) an operation on the logical page in dependence upon the identified portion of the operational entry for the tier; and selecting (312) operation results from the logical pages on the entry path (316) for the operational entry.

The method of FIG. 4 differs from the method of FIG. 3 in that performing (310) an operation on the logical page in dependence upon the identified portion of the operational entry for the tier according to the method of FIG. 4 includes searching (400) the logical page for a subentry that matches the identified portion (308) of the operational entry for the tier by traversing the radix nodes of the logical page. In the method of FIG. 4, searching (400) the logical page for a subentry that matches the identified portion (308) of the operational entry for the tier by traversing the radix nodes of the logical page may be carried out by traversing through the radix nodes of the logical page according to the value of the bit in the portion (308) of the operational entry that corresponds with each radix node as specified by the radix node's compare bit. Encountering a terminating node before traversing through the radix nodes according to all the bits of the portion (308) of the operational entry indicates that portion (308) of the operational entry is not contained in the logical page because the logical connections among the radix nodes of the logical page do not represent the portion (308) of the operational entry. Encountering a terminating node or pointer to another logical page after traversing through the radix nodes according to all the bits of the portion (308) of the operational entry, however, indicates that portion (308) of the operational entry is contained in the logical page because the logical connections among the radix nodes of the logical page do represent the portion (308) of the operational entry.

Consider, for example, the PBRT (401) and an operation entry (302) of 'AAABBBDDD.' In such an example, the processor for the root logical page in the top tier searches the subentries of the root logical page for the portion 'AAA' of the entry 'AAABBBDDD;' the processors for logical pages in the middle tier search the subentries of the logical pages for the portion 'BBB' of the entry 'AAABBBDDD;' and the processors for logical pages in the bottom tier search the subentries of the logical pages for the portion 'DDD' of the entry 'AAABBBDDD.' The logical pages of the PBRT (401) having a subentry that matches the identified portion of the operational entry for the tier are indicated by the grey shading in FIG. 4.

Searching (400) the logical page for a subentry that matches the identified portion (308) of the operational entry for the tier by traversing the radix nodes of the logical page according to the method of FIG. 4 may further be carried out by returning search results (404) for each logical page in the PBRT (401). The search results (404) of FIG. 4 are operation results that represent the results returned for each logical page in the PBRT (301) from a search operation performed in parallel on the PBRT (401). In the example of FIG. 4, the search results (404) returned for each logical page shaded in grey indicate that the logical page has a subentry that matches the identified portion of the operational entry for the tier of the logical page. The search results (404) returned for each logical page not shaded in grey indicate that the logical page does not have a subentry that matches the identified portion of the operational entry for the tier of the logical page.

In the method of FIG. 4, selecting (312) operation results from the logical pages on the entry path (316) for the operational entry (302) includes selecting (402), from the logical pages having a subentry that matches the identified portion of the operational entry, search results (404) from the logical pages on the entry path (316) for the operational entry (302). Selecting (402), from the logical pages having a subentry that matches the identified portion of the operational entry, search results (404) from the logical pages on the entry path (316) for the operational entry (302) according to the method of FIG. 4 may be carried out by receiving, in each processor mapped to a logical page of the PBRT (401), search results for the child logical page on the entry path (316), combining the received search results with the search results for the processor's logical page, and passing the combined search results to the processor for parent logical page. As mentioned above, a processor may identify which child logical page is on the entry path (316) using a pointer on the entry path (316) at the lowest level of the sub tree in the processor's logical page.

Continuing with the example from above in using the exemplary PBRT (401) and an operation entry (308) of 'AAABBBDDD,' readers will recall that the four logical pages of the PBRT (401) having a subentry that matches the identified portion of the operational entry for the tier are indicated by the grey shading in FIG. 4. The logical pages on the path of entry are indicated in FIG. 4 using a dotted line that surrounds the logical pages on the path of entry (316) for the operational entry 'AAABBBDDD.' The only logical page in the middle tier of the PBRT (401) containing a subentry that matches the identified portion of the operational entry for the logical page is the logical page containing 'BBB.' The processor for the logical page containing 'BBB' receives the search results from the child logical page containing 'DDD.' The search results for the other child logical pages descending from the logical page containing 'BBB' are ignored because the pointer on the path of entry for 'AAABBBDDD' points to the logical page containing 'DDD.' The processor for the logical page containing 'CCC' ignores the search results for the child logical page containing 'DDD' not on the entry path (316) because the logical page containing 'CCC' does not contain a subentry 'BBB' and cannot be on the entry path (316) for the operational entry 'AAABBBDDD.' After receiving the search results from the logical page containing 'DDD,' the processor for the logical page containing 'BBB' combines the received results with its own and passes the combined results up the tree to the processor for the parent logical page containing 'AAA.' The processor for the logical page containing 'AAA' receives the search results from the child logical page containing 'BBB.' The search results for the other child logical pages descending from the logical page containing 'AAA' are ignored because the pointer on the path of entry for 'AAABBBDDD' points to the logical page containing 'BBB.' After receiving the search results from the logical page containing 'BBB,' the processor for the root logical page containing 'AAA' combines the received results with its own to indicate that the PBRT (401) contains the entry 'AAABBBDDD.'

As mentioned above, performing an operation on the logical page in dependence upon the identified portion of the operational entry for the tier may be carried out by inserting into the logical page a subentry that matches the identified portion of the operational entry for the tier by modifying logical connections among radix nodes of the logical page. For further explanation, therefore, FIG. 5 sets forth a flow chart illustrating a further exemplary method for parallel execution of operations for a partitioned binary radix tree (501) on a parallel computer according to embodiments of the present invention that includes inserting (500) into the logical page a subentry that matches the identified portion of the operational entry for the tier by modifying logical connections among radix nodes of the logical page.

Figure 5:
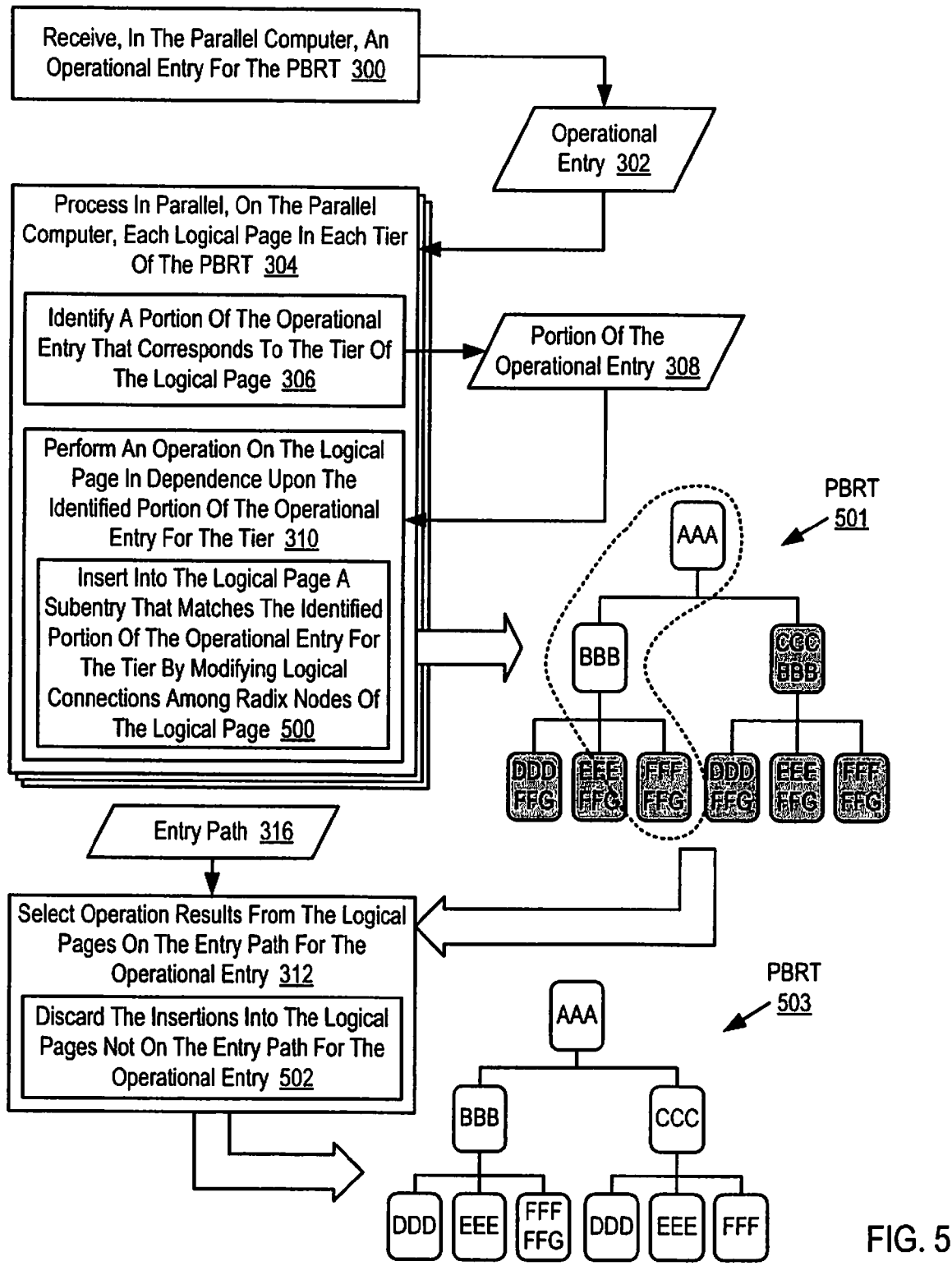
FIG. 5 sets forth a flow chart illustrating a further exemplary method for parallel execution of operations for a partitioned binary radix tree on a parallel computer according to embodiments of the present invention.

In the example of FIG. 5, the PBRT (501) includes a plurality of logical pages that contain a plurality of entries in the PBRT (501). Each logical page of the PBRT (501) is included in a tier of the PBRT (501) and contains one or more subentries represented by a plurality of radix nodes organized as a sub tree on the logical page. Each subentry is a portion of an entry that corresponds to the tier of the logical page containing the subentry. Each entry in the PBRT (501) is composed of a subentry from each logical page on an entry path for the entry.

The method of FIG. 5 is similar to the method of FIG. 3. That is, the method of FIG. 5 is similar to the method of FIG. 3 in that the method of FIG. 5 includes: receiving (300), in the parallel computer, an operational entry (302) for the PBRT (501); processing (304) in parallel, on a parallel computer, each logical page in each tier of the PBRT (501), including: identifying (306) a portion (308) of the operational entry that corresponds to the tier of the logical page, and performing (310) an operation on the logical page in dependence upon the identified portion of the operational entry for the tier; and selecting (312) operation results from the logical pages on the entry path (316) for the operational entry (302).

The method of FIG. 5 differs from the method of FIG. 3 in that performing (310) an operation on the logical page in dependence upon the identified portion of the operational entry for the tier according to the method of FIG. 5 includes inserting (500) into the logical page a subentry that matches the identified portion of the operational entry for the tier by modifying logical connections among radix nodes of the logical page. Inserting (500) into the logical page a subentry that matches the identified portion of the operational entry for the tier by modifying logical connections among radix nodes of the logical page according to the method of FIG. 5 may be carried out by establishing logical connections among radix nodes of the logical page according to the value of the bit in the portion (308) of the operational entry that corresponds with each radix node as specified by the radix node's compare bit.

Consider, for example, the PBRT (501) and an operation entry (302) of 'AAABBBFFG.' In such an example, the processors for the logical pages insert, into the logical pages, the portion (308) of the operational entry corresponds to the tier of each logical page that does not already contain a subentry that matches the portion (308). The processors for logical pages in the bottom tier insert the subentry 'FFG' into the logical pages for the portion 'FFG' of the entry 'AAABBBFFG' that corresponds to the bottom tier. The processor for the logical page containing 'CCC' inserts the subentry 'BBB' into the logical page for the portion 'BBB' of the entry 'AAABBBFFG' that corresponds to the middle tier. The processor for the logical page containing 'BBB,' however, identifies that the subentry 'BBB' has already been inserted into the logical page and no need exists to insert the subentry again. Similarly, the processor for the logical page containing 'AAA' identifies that the subentry 'AAA' has already been inserted into the logical page for the portion 'AAA' of the entry 'AAABBBFFG' that corresponds to the top tier. The logical pages of the PBRT (501) into which insertions are made are indicated by the grey shading in FIG. 5.

In the method of FIG. 5, selecting (312) operation results from the logical pages on the entry path (316) for the operational entry (302) includes discarding (502) the insertions into the logical pages not on the entry path (316) for the operational entry. Discarding (502) the insertions into the logical pages not on the entry path (316) for the operational entry according to the method of FIG. 5 may be carried out by receiving a signal in the processor for each logical page that indicates that the logical page is not on the entry path (316) for the operational entry (302), and discarding by each processor receiving the signal any insertions into the processor's logical page. As mentioned above, a processor may identify which logical page is on the entry path (316) hierarchically below the processor's logical page using a pointer on the entry path (316) at the lowest level of the sub tree in the processor's logical page. Processors for logical pages in one tier may therefore provide the signal to processors for child logical pages the next lower tier.

Continuing with the example from above in using the exemplary PBRT (501) and an operation entry (308) of 'AAABBBFFG,' readers will recall that insertions were made into the seven logical pages of the PBRT (501) indicated by the grey shading in FIG. 5. The logical pages on the path of entry are indicated in FIG. 5 using a dotted line that surrounds the logical pages on the path of entry (316) for the operational entry 'AAABBBFFG.' The processor for the logical page containing 'CCC' provides a signal to the processors for the logical pages containing 'DDD,' 'EEE,' and 'FFF,' respectively, indicating that none of the pages are on the entry path for the operational entry 'AAABBBFFG.' The processors for the logical pages containing 'DDD,' 'EEE,' and 'FFF,' hierarchically beneath the logical page containing 'CCC,' therefore, discard the insertions into those pages. Similarly, the processor for the logical page containing 'BBB' provides a signal to the processors for the logical page containing 'DDD' and 'EEE,' respectively, indicating that none of the pages are on the entry path for the operational entry 'AAABBBFFG.' The processors for the logical pages containing 'DDD' and 'EEE' hierarchically beneath the logical page containing 'BBB,' therefore, discard the insertions into those pages. The resulting PBRT from the insertion operation in this example is PBRT (503) depicted in FIG. 5.

As mentioned above, performing an operation on the logical page in dependence upon the identified portion of the operational entry for the tier may be carried out by deleting from the logical page a subentry that matches the identified portion of the operational entry for the tier by modifying logical connections among radix nodes of the logical page if the subentry that matches the identified portion of the operational entry for the tier is not comprised in more than one entry of the PBRT. For further explanation, therefore, FIG. 6 sets forth a flow chart illustrating a further exemplary method for parallel execution of operations for a partitioned binary radix tree (601) on a parallel computer according to embodiments of the present invention that includes deleting (602) from the logical page a subentry that matches the identified portion (308) of the operational entry for the tier by modifying logical connections among radix nodes of the logical page if the subentry that matches the identified portion (308) of the operational entry for the tier is not comprised in more than one entry of the PBRT.

Figure 6:
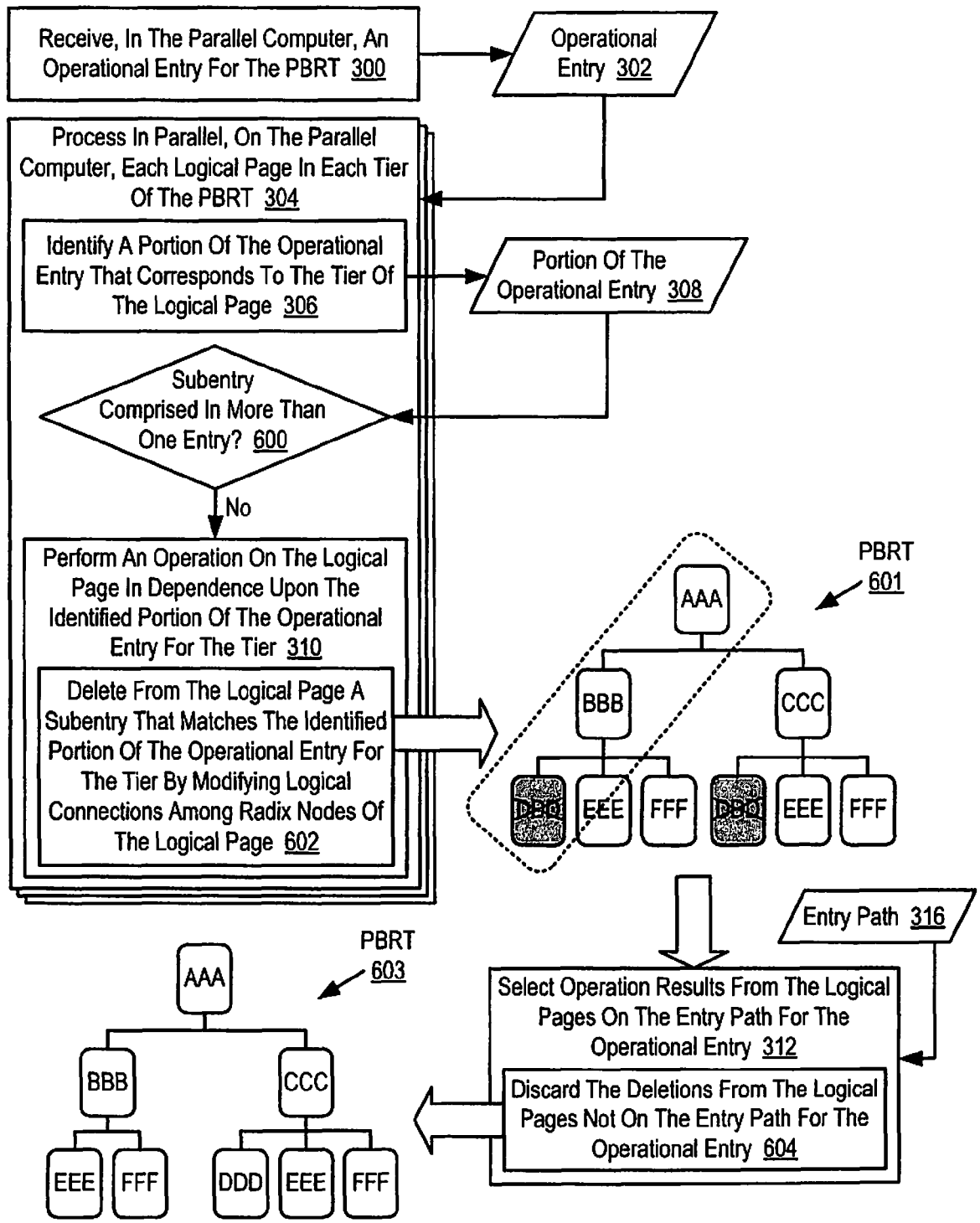
FIG. 6 sets forth a flow chart illustrating a further exemplary method for parallel execution of operations for a partitioned binary radix tree on a parallel computer according to embodiments of the present invention.

In the example of FIG. 6, the PBRT (601) includes a plurality of logical pages that contain a plurality of entries in the PBRT (601). Each logical page of the PBRT (601) is included in a tier of the PBRT (601) and contains one or more subentries represented by a plurality of radix nodes organized as a sub tree on the logical page. Each subentry is a portion of an entry that corresponds to the tier of the logical page containing the subentry. Each entry in the PBRT (601) is composed of a subentry from each logical page on an entry path for the entry.

The method of FIG. 6 is similar to the method of FIG. 3. That is, the method of FIG. 6 is similar to the method of FIG. 3 in that the method of FIG. 6 includes: receiving (300), in the parallel computer, an operational entry (302) for the PBRT (601); processing (304) in parallel, on a parallel computer, each logical page in each tier of the PBRT (601), including: identifying (306) a portion (308) of the operational entry that corresponds to the tier of the logical page, and performing (310) an operation on the logical page in dependence upon the identified portion (308) of the operational entry for the tier; and selecting (312) operation results from the logical pages on the entry path (316) for the operational entry (302).

The method of FIG. 6 differs from the method of FIG. 3 in that processing (304) in parallel, on the parallel computer, each logical page in each tier of the PBRT according to the method of FIG. 6 includes determining (600) whether a subentry that matches the identified portion of the operational entry for the tier is included in more than one entry of the PBRT. In the method of FIG. 6, determining (600) whether a subentry that matches the identified portion (308) of the operational entry for the tier is comprised in more than one entry of the PBRT may be carried out by identifying whether more than one pointer to other logical pages exists at the lowest level of the sub tree in the logical page for the subentry. When more than one pointer to other logical pages exists at the lowest level of the sub tree in the logical page for the subentry, then the subentry that matches the identified portion (308) of the operational entry for the tier is included in more than one entry of the PBRT.

In the method of FIG. 6, determining (600) whether a subentry that matches the identified portion (308) of the operational entry for the tier is comprised in more than one entry of the PBRT may also be carried out by identifying whether both a terminating node and a pointer exists at the lowest level of the sub tree in the logical page for the subentry. When both a terminating node and a pointer exists at the lowest level of the sub tree in the logical page for the subentry, then the subentry that matches the identified portion (308) of the operational entry for the tier is included in more than one entry of the PBRT.

In the method of FIG. 6, performing (310) an operation on the logical page in dependence upon the identified portion of the operational entry for the tier includes deleting (602) from the logical page a subentry that matches the identified portion (308) of the operational entry for the tier by modifying logical connections among radix nodes of the logical page if the subentry that matches the identified portion of the operational entry for the tier is not comprised in more than one entry of the PBRT. Deleting (602) from the logical page a subentry that matches the identified portion (308) of the operational entry for the tier by modifying logical connections among radix nodes of the logical page according to the method of FIG. 6 may be carried out by removing logical connections among radix nodes of the logical page according to the value of the bit in the portion (308) of the operational entry that corresponds with each radix node as specified by the radix node's compare bit.

Consider, for example, the PBRT (601) and an operation entry (302) of 'AAABBBDDD.' In such an example, the processor for each logical pages deletes from the logical page a subentry that matches the identified portion of the operational entry for the tier by modifying logical connections among radix nodes of the logical page if the subentry that matches the identified portion of the operational entry for the tier is not comprised in more than one entry of the PBRT. In the PBRT (601) of FIG. 6, the 'X' over a subentry indicates that a subentry matches the identified portion of the operational entry for the tier and is not comprised in more than one entry of the PBRT (501). The processors of both the logical pages containing 'DDD,' therefore, delete the subentry 'DDD' that corresponds to the portion 'DDD' of the operational entry 'AAABBBDDD.' The logical pages of the PBRT (601) from which deletions are made are indicated by the grey shading in FIG. 6.

In the method of FIG. 6, selecting (312) operation results from the logical pages on the entry path (316) for the operational entry (302) includes discarding (604) the deletions from the logical pages not on the entry path for the operational entry. Discarding (604) the deletions from the logical pages not on the entry path for the operational entry according to the method of FIG. 6 may be carried out by receiving a signal in the processor for each logical page that indicates that the logical page is not on the entry path (316) for the operational entry (302), and discarding by each processor receiving the signal any deletions from the processor's logical page. As mentioned above, a processor may identify which child logical page is on the entry path (316) using a pointer on the entry path (316) at the lowest level of the sub tree in the processor's logical page. Processors for logical pages in one tier may therefore provide the signal to processors for child logical pages the next lower tier.

Continuing with the example from above in using the exemplary PBRT (601) and an exemplary operation entry of 'AAABBBDDD,' readers will recall that deletions were made from the two logical pages of the PBRT (601) indicated by the grey shading in FIG. 6. The logical pages on the path of entry are indicated in FIG. 6 using a dotted line that surrounds the logical pages on the path of entry for the operational entry 'AAABBBDDD.' The processor for the logical page containing 'CCC' provides a signal to the processor for the logical page containing 'DDD' indicating that the page is not on the entry path for the operational entry 'AAABBBDDD.' The processor for the logical page containing 'DDD' that is hierarchically beneath the logical page containing 'CCC,' therefore, discards the deletions from that page. The resulting PBRT from the deletion operation in this example is PBRT (603) depicted in FIG. 6.

Figure 7:
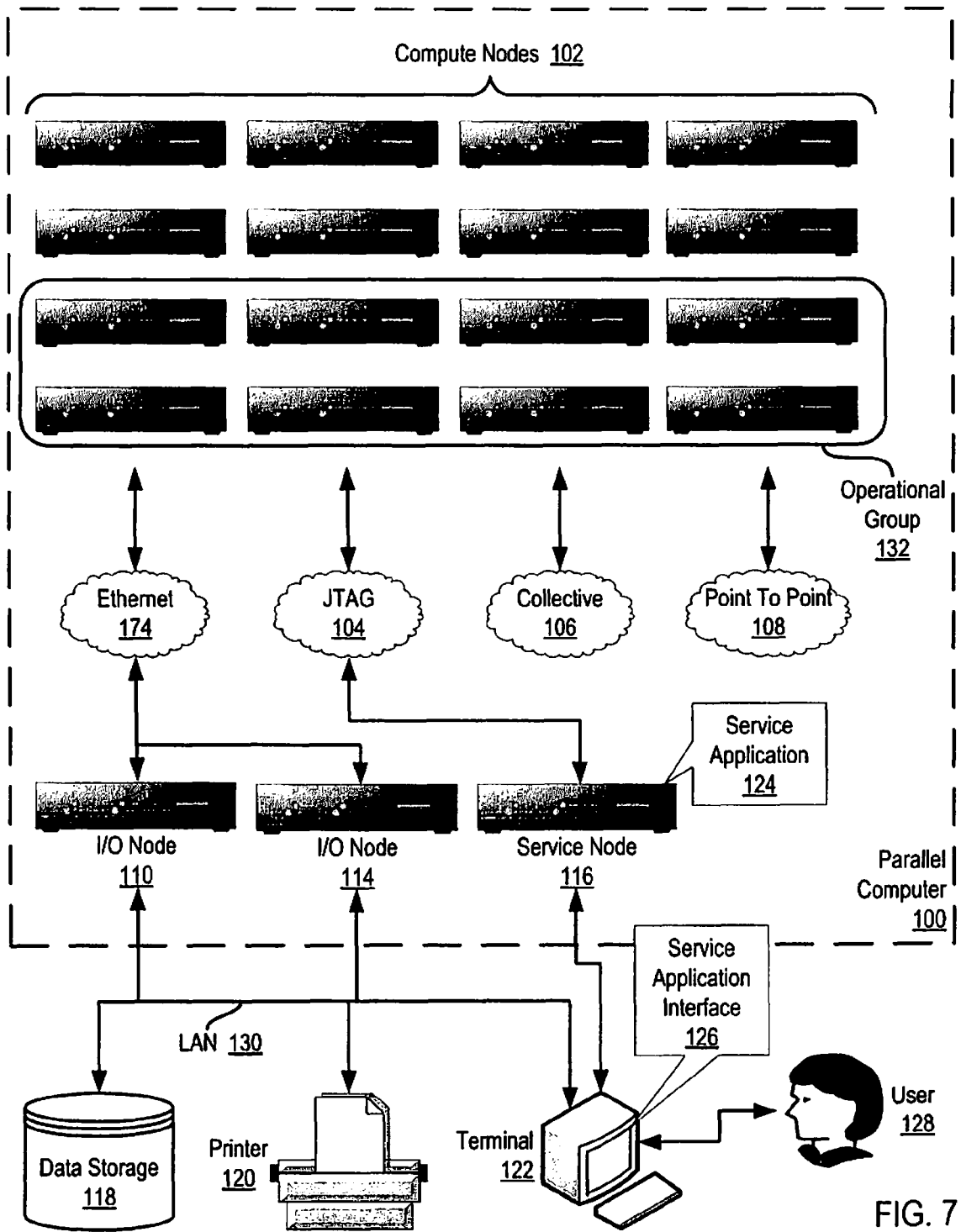
FIG. 7 illustrates an exemplary system for parallel execution of operations for a partitioned binary radix tree according to embodiments of the present invention.

As explained above, parallel execution of operations for a partitioned binary radix tree according to embodiments of the present invention is carried out on a parallel computer. For further explanation, therefore, FIG. 7 illustrates an exemplary system for parallel execution of operations for a partitioned binary radix tree according to embodiments of the present invention. The system of FIG. 7 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 7 includes a plurality of compute nodes (102). A compute node is a processing device that executes an individual piece of a parallel algorithm. A compute node includes both a computer processor and computer memory coupled to the computer processor.

The compute nodes (102) are coupled for data communications by several independent data communications networks including a high speed Ethernet network (174), a Joint Test Action Group ('JTAG') network (104), a tree network (106) which is optimized for collective operations, and a torus network (108) which is optimized point to point operations. Tree network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operations for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be useful for parallel execution of operations for a partitioned binary radix tree on a parallel computer according to embodiments of the present invention include MPI and the 'Parallel Virtual Machine' ('PVM') library. PVM was developed by the University of Tennessee, The Oak Ridge National Laboratory and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

In addition to compute nodes, computer (100) includes input/output ('I/O') nodes (110, 114) coupled to compute nodes (102) through one of the data communications networks (174). The I/O nodes (110, 114) provide I/O services between compute nodes (102) and I/O devices (118, 120, 122). I/O nodes (110, 114) are connected for data communications I/O devices (118, 120, 122) through local area network ('LAN') (130). Computer (100) also includes a service node (116) coupled to the compute nodes through one of the networks (104). Service node (116) provides service common to pluralities of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

As described in more detail above in this specification, the system of FIG. 7 operates generally for parallel execution of operations for a partitioned binary radix tree. In the example of FIG. 7, each logical page of the PBRT is configured on a different compute node in the operational group (132). The PBRT includes a plurality of logical pages that contain a plurality of entries in the PBRT. Each logical page is included in a tier of the PBRT and contains one or more subentries represented by a plurality of radix nodes organized as a sub tree on the logical page. Each subentry is a portion of an entry that corresponds to the tier of the logical page containing the subentry. Each entry in the PBRT is composed of a subentry from each logical page on an entry path for the entry.

The arrangement of nodes, networks, and I/O devices making up the exemplary system illustrated in FIG. 7 are for explanation only, not for limitation of the present invention. Data processing systems capable of parallel execution of operations for a partitioned binary radix tree on a parallel computer according to embodiments of the present invention may include additional nodes, networks, devices, and architectures, not shown in FIG. 7, as will occur to those of skill in the art. The parallel computer (100) in the example of FIG. 7 includes sixteen compute nodes (102); parallel computers capable of parallel execution of operations for a partitioned binary radix tree according to embodiments of the present invention sometimes include thousands of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 7. For example, another architecture of systems that executes in parallel operations for a partitioned binary radix tree according to embodiments of the present invention may include an exemplary parallel computer having a plurality of computer processors and shared computer memory accessible to the plurality of computer processors. In such an exemplary parallel computer, the shared computer memory is partitioned into a plurality of memory partitions, each logical page of the PBRT is configured on a different memory partition, and each processor is mapped to a different memory partition.

Parallel execution of operations for a partitioned binary radix tree on a parallel computer according to embodiments of the present invention may be implemented on a parallel computer that includes a plurality of compute nodes. In fact, such computers may include thousands of such compute nodes. Each compute node is in turn itself a kind of computer composed of one or more computer processors, its own computer memory, and its own input/output adapters. For further explanation, therefore, FIG. 8 sets forth a block diagram of an exemplary compute node useful in a parallel computer capable of parallel execution of operations for a partitioned binary radix tree according to embodiments of the present invention. The compute node (152) of FIG. 8 includes at least one computer processor (164) as well as random access memory ('RAM') (156). Processor (164) is connected to RAM (156) through a high-speed memory bus (154) and through a bus adapter (194) and a extension bus (168) to other components of the compute node.

Figure 8:
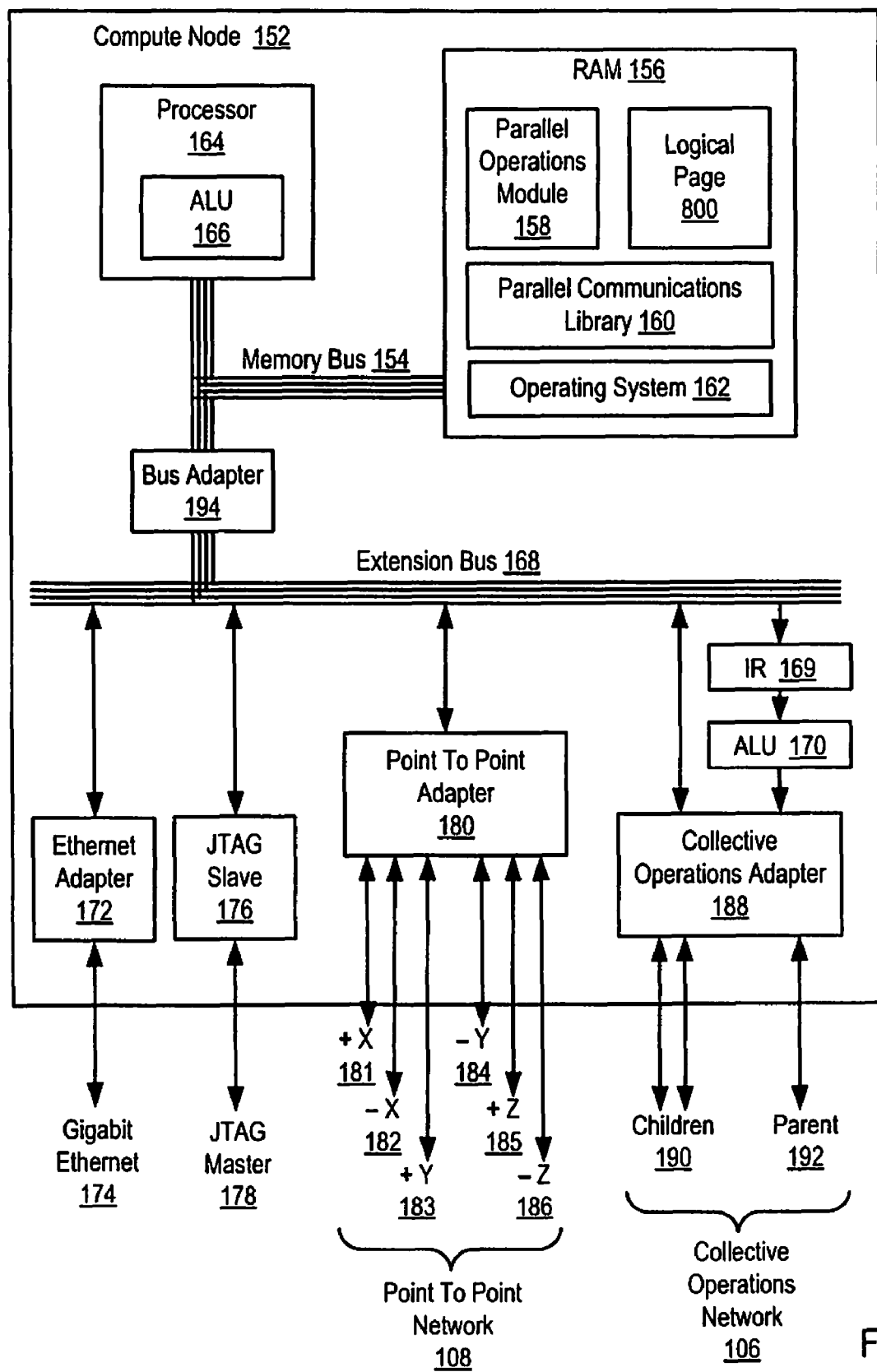
FIG. 8 sets forth a block diagram of an exemplary compute node useful in a parallel computer capable of parallel execution of operations for a partitioned binary radix tree according to embodiments of the present invention.

Stored in RAM (156) is a parallel operations module (158), a module of computer program instructions that carries out parallel execution of operations for a partitioned binary radix tree according to embodiments of the present invention. The PBRT includes a plurality of logical pages that contain a plurality of entries in the PBRT. Each logical page is included in a tier of the PBRT and contains one or more subentries represented by a plurality of radix nodes organized as a sub tree on the logical page. Each subentry is a portion of an entry that corresponds to the tier of the logical page containing the subentry. Each entry in the PBRT is composed of a subentry from each logical page on an entry path for the entry. In the example of FIG. 8, one logical page (800) of the PBRT is configured on the compute node (152). The parallel operations module (158) generally operates for parallel execution of operations for a partitioned binary radix tree according to embodiments of the present invention by: receiving, in the parallel computer, an operational entry for the PBRT; processing in parallel, on the parallel computer, each logical page in each tier of the PBRT, including: identifying a portion of the operational entry that corresponds to the tier of the logical page, and performing an operation on the logical page in dependence upon the identified portion of the operational entry for the tier; and selecting operation results from the logical pages on the entry path for the operational entry.

Also stored RAM (156) is a parallel communications library (160), a library of computer program instructions that carry out parallel communications among compute nodes configured with the logical pages of the PBRT, including point to point operations as well as collective operations. Application program (158) executes collective operations by calling software routines in parallel communications library (160). A library of parallel communications routines may be developed from scratch for use in parallel execution of operations for a partitioned binary radix tree on a parallel computer according to embodiments of the present invention, using a traditional programming language such as the C programming language, and using traditional programming methods to write parallel communications routines that send and receive data among nodes on two independent data communications networks. Alternatively, existing prior art libraries may be used. Examples of prior-art parallel communications libraries that may be useful for parallel execution of operations for a partitioned binary radix tree on a parallel computer according to embodiments of the present invention include the 'Message Passing Interface' ('MPI') library and the 'Parallel Virtual Machine' ('PVM') library.

Also stored in RAM (156) is an operating system (162), a module of computer program instructions and routines for a parallel operations module's access to other resources of the compute node. It is typical for an application program, such as the parallel operations module (158), and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 8, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, IBM's AIX™, IBM's i5/OS™, and others as will occur to those of skill in the art.

The exemplary compute node (152) of FIG. 8 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in systems that execute in parallel operations for a partitioned binary radix tree ('PBRT') according to embodiments of the present invention include modems for wired communications, Ethernet (IEEE 802.3) adapters for wired network communications, and 802.11b adapters for wireless network communications.

The data communications adapters in the example of FIG. 8 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 8 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 8 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in parallel execution of operations for a partitioned binary radix tree on a parallel computer according to embodiments of the present invention.

The data communications adapters in the example of FIG. 8 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 8 include a Collective Operations Adapter (188) that couples example compute node (152) for data communications to a network (106) that is optimal for collective message passing operations such as, for example, a network configured as a binary tree. Collective Operations Adapter (188) provides data communications through three bidirectional links: two to children nodes (190) and one to a parent node (192).

Exemplary compute node (152) includes two arithmetic logic units ('ALUs'). ALU (166) is a component of processor (164), and a separate ALU (170) is dedicated to the exclusive use of collective operations adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, collective operations adapter (188) may execute the arithmetic or logical operation by use of ALU (166) in processor (164) or, typically much faster, by use dedicated ALU (170).

Although the exemplary system of FIG. 8 that executes in parallel operations for a partitioned binary radix tree according to embodiments of the present invention depicts computer memory coupled to only a single processor, such an architecture is for explanation only. In fact, other architectures of systems that execute in parallel operations for a partitioned binary radix tree according to embodiments of the present invention may include an exemplary parallel computer having a plurality of computer processors and shared computer memory accessible to the plurality of computer processors. In such an exemplary parallel computer, the shared computer memory is partitioned into a plurality of memory partitions, each logical page of the PBRT is configured on a different memory partition, and each processor is mapped to a different memory partition.

Figure 9A:
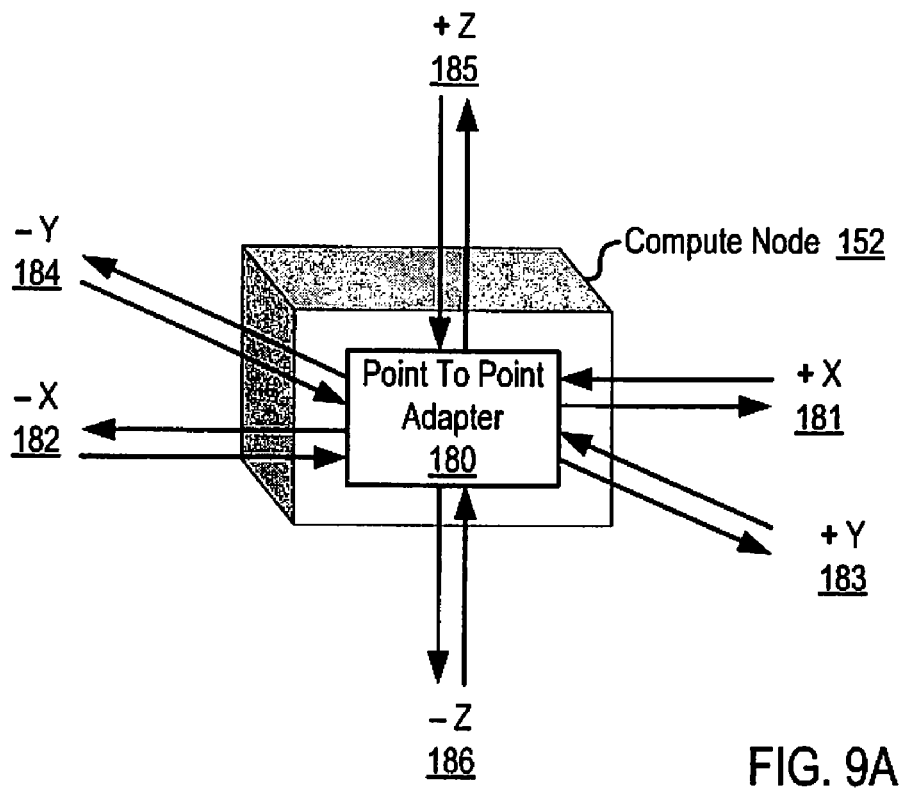
FIG. 9A illustrates an exemplary Point To Point Adapter useful in systems that execute in parallel operations for a partitioned binary radix tree according to embodiments of the present invention.

As mentioned above, a compute node may include a Point To Point Adapter and a Collective Operations Adapter for data communications with other computer nodes. For further explanation, therefore, FIG. 9A illustrates an exemplary Point To Point Adapter (180) useful in systems that execute in parallel operations for a partitioned binary radix tree according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 9A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in also provides data communication along a z-axis through four unidirectional data communications links, to and from the next node in the −z direction (186) and to and from the next node in the +z direction (185).

Figure 9B:
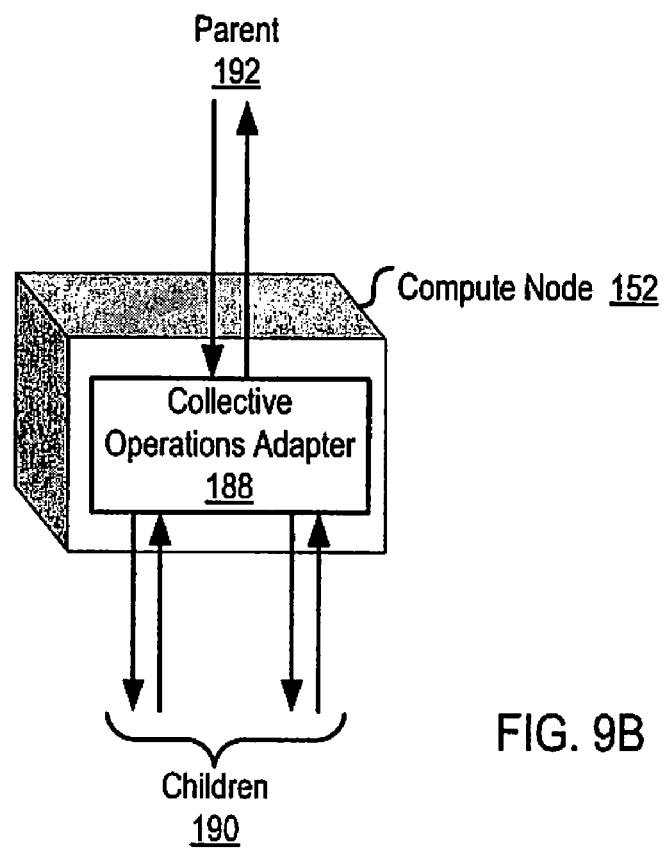
FIG. 9B illustrates an exemplary Collective Operations Adapter useful in systems that execute in parallel operations for a partitioned binary radix tree according to embodiments of the present invention.

For further explanation, FIG. 9B illustrates an exemplary Collective Operations Adapter (188) useful in systems that execute in parallel operations for a partitioned binary radix tree according to embodiments of the present invention. Collective Operations Adapter (188) is designed for use in a network optimized for collective operations, a network that organizes compute nodes of a parallel computer in a binary tree. Collective Operations Adapter (188) in the example of FIG. 9B provides data communication to and from two children compute nodes through four unidirectional data communications links (190). Collective Operations Adapter (188) also provides data communication to and from a parent compute node through two unidirectional data communications links (192).

Figure 10:
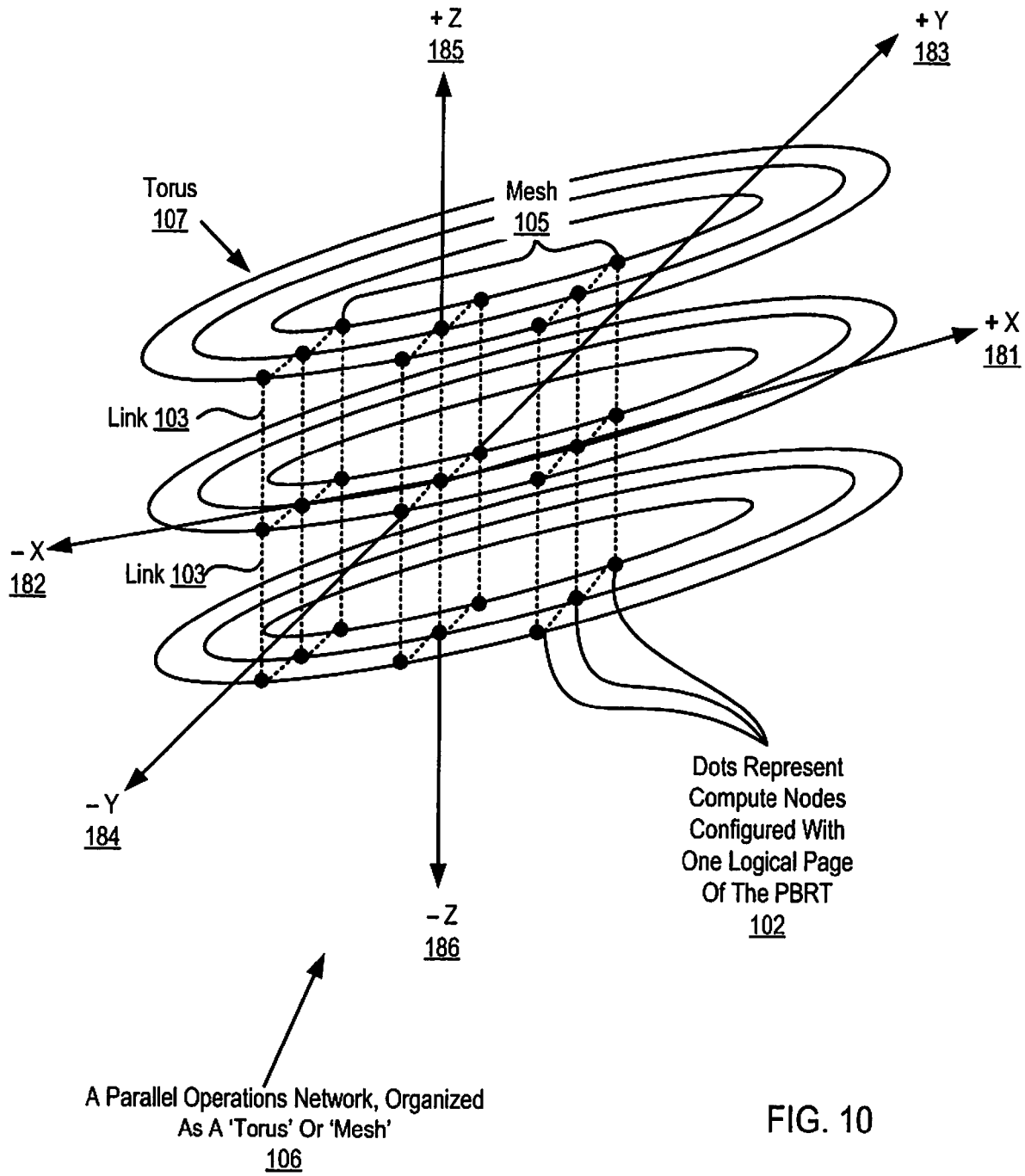
FIG. 10 illustrates an exemplary data communications network optimized for point to point operations.

For further explanation, FIG. 10 illustrates an exemplary data communications network optimized for point to point operations (106). In the example of FIG. 10, dots represent compute nodes (102) of a parallel computer, each compute node configured with one logical page of a partitioned binary radix tree, and the dotted lines between the dots represent data communications links between compute nodes. The data communications links are implemented with point to point data communications adapters similar to the one illustrated for example in FIG. 9A, with data communications links on three axes, x, y, and z, and to and fro in six directions +x (181), −x (182), +y (183), −y (184), +z (185), and −z (186). The links and compute nodes are organized by this data communications network optimized for point to point operations into a three dimensional mesh (105) that wraps around to form a torus (107). Each compute node in the torus has a location in the torus that is uniquely specified by a set of x, y, z coordinates. For clarity of explanation, the data communications network of FIG. 10 is illustrated with only 27 compute nodes, but readers will recognize that a data communications network optimized for point to point operations for use in parallel execution of operations for a partitioned binary radix tree on a parallel computer in accordance with embodiments of the present invention may contain only a few compute nodes or may contain thousands of compute nodes.

Figure 11:
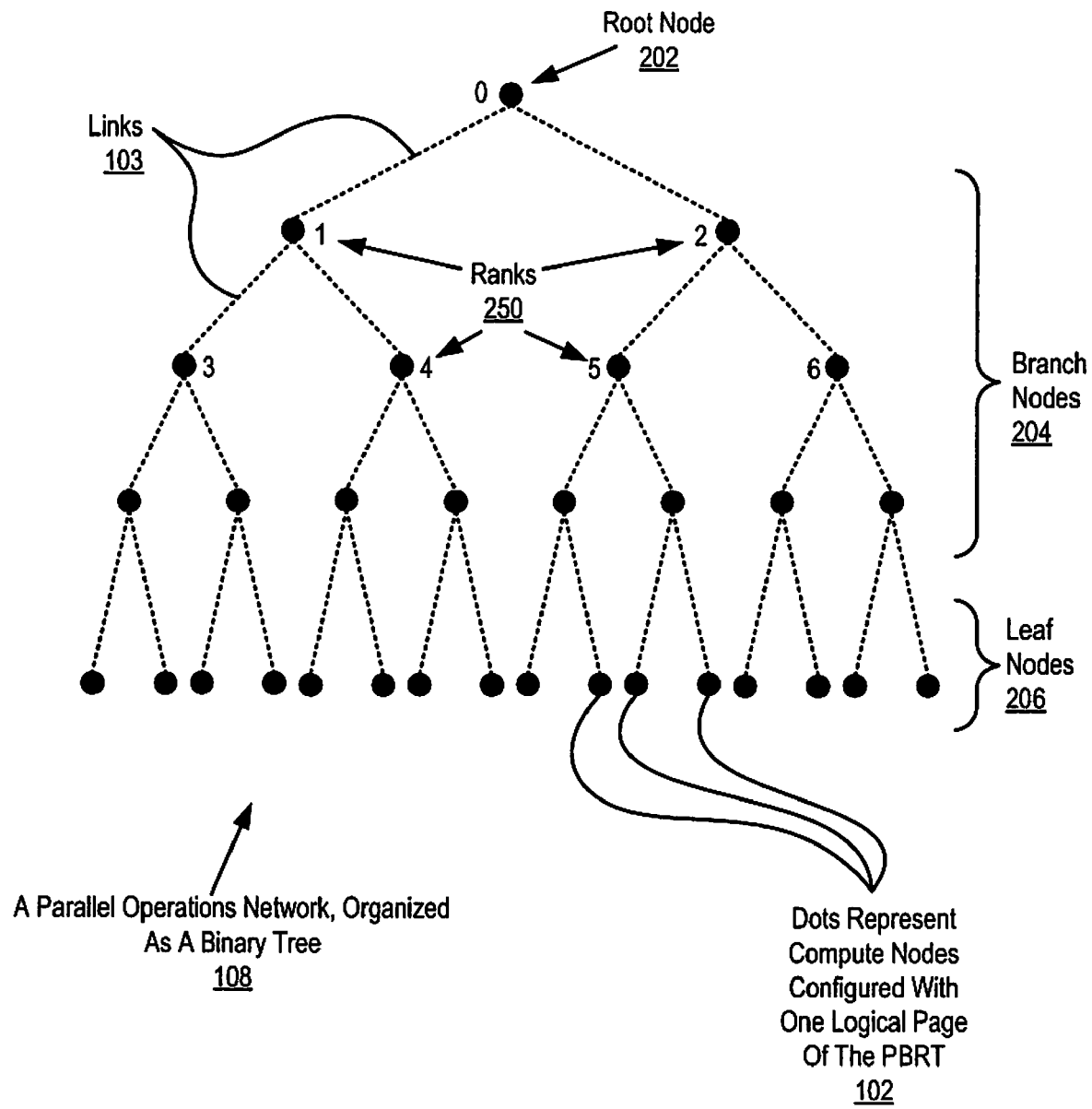
FIG. 11 illustrates an exemplary data communications network (108) optimized for collective operations by organizing compute nodes in a tree.

For further explanation, FIG. 11 illustrates an exemplary data communications network (108) optimized for collective operations by organizing compute nodes in a tree. The example data communications network of FIG. 11 includes data communications links connected to the compute nodes so as to organize the compute nodes as a tree. In the example of FIG. 11, dots represent compute nodes (102) of a parallel computer, each compute node configured with one logical page of a partitioned binary radix tree, and the dotted lines (103) between the dots represent data communications links between compute nodes. The data communications links are implemented with collective operations data communications adapters similar to the one illustrated for example in FIG. 9B, with each node typically providing data communications to and from two children compute nodes and data communications to and from a compute parent node, with some exceptions. Compute nodes in a binary tree may be characterized as a root compute node (202), branch compute nodes (204), and leaf compute nodes (206). The root compute node (202) has two children but no parent. The leaf compute nodes (206) each have a parent, but leaf nodes have no children. The branch compute nodes (204) each have both a parent and two children. The links and compute nodes are thereby organized by this data communications network optimized for collective operations into a binary tree (108). For clarity of explanation, the data communications network of FIG. 11 is illustrated with only 31 compute nodes, but readers will recognize that a data communications network optimized for collective operations for use in parallel execution of operations for a partitioned binary radix tree on a parallel computer in accordance with embodiments of the present invention may contain only a few compute nodes or may contain thousands of compute nodes.

In the example of FIG. 11, each compute node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root compute node (202), 1 assigned to the first compute node in the second layer of the tree, 2 assigned to the second compute node in the second layer of the tree, 3 assigned to the first compute node in the third layer of the tree, 4 assigned to the second compute node in the third layer of the tree, and so on. For ease of illustration, only the ranks of the first three layers of the tree are shown here, but all compute nodes in the tree network are assigned a unique rank for identification.

Exemplary embodiments of the present invention are described largely in the context of a fully functional computer system for parallel execution of operations for a partitioned binary radix tree on a parallel computer. Readers of skill in the art will recognize, however, that the present invention also may be embodied in a computer program product disposed on recordable media for machine-readable information, including magnetic media, optical media, or other suitable media. Examples of recordable media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of parallel execution of operations for a previously established partitioned binary radix tree ('PBRT') on a parallel computer, the previously established PBRT comprising:
   a plurality of logical pages that contain a plurality of entries in the previously established PBRT, each logical page included in a tier of the previously established PBRT and containing one or more subentries represented by a plurality of radix nodes organized as a sub tree on the logical page, each subentry is a portion of an entry that corresponds to the tier of the logical page containing the subentry, each entry in the previously established PBRT is composed of a subentry from each logical page on an entry path for the entry,
   the method comprising:
   receiving, in the parallel computer, an operational entry for the previously established PBRT;
   processing in parallel, on the parallel computer, each logical page in each tier of the previously established PBRT, including:
      identifying a portion of the operational entry that corresponds to the tier of the logical page, and
      performing an operation on the logical page in dependence upon the identified portion of the operational entry for the tier; and
   selecting operation results from the logical pages on the entry path for the operational entry.

2. The method of claim 1 wherein the parallel computer further comprises a plurality of compute nodes, the compute nodes organized into at least one operational group of compute nodes for collective parallel operations on the parallel computer, the method further comprising:
   configuring each logical page of the previously established PBRT on a different compute node in the operational group.

3. The method of claim 1 wherein the parallel computer further comprises a plurality of computer processors and shared computer memory accessible to the plurality of computer processors, the shared computer memory partitioned into a plurality of memory partitions, the method further comprising:
   configuring each logical page of the previously established PBRT on a different memory partition; and
   mapping each processor to a different memory partition.

4. The method of claim 1 wherein:
   performing an operation on the logical page in dependence upon the identified portion of the operational entry for the tier further comprises searching the logical page for a subentry that matches the identified portion of the operational entry for the tier by traversing the radix nodes of the logical page; and
   selecting operation results from the logical pages on the entry path for the operational entry further comprises selecting, from the logical pages having a subentry that matches the identified portion of the operational entry, search results from the logical pages on the entry path for the operational entry.

5. The method of claim 1 wherein:
   performing an operation on the logical page in dependence upon the identified portion of the operational entry for the tier further comprises inserting into the logical page a subentry that matches the identified portion of the operational entry for the tier by modifying logical connections among radix nodes of the logical page; and
   selecting operation results from the logical pages on the entry path for the operational entry further comprises discarding the insertions into the logical pages not on the entry path for the operational entry.

6. The method of claim 1 wherein:
   processing in parallel, on the parallel computer, each logical page in each tier of the previously established PBRT further comprises determining whether a subentry that matches the identified portion of the operational entry for the tier is comprised in more than one entry of the previously established PBRT;
   performing an operation on the logical page in dependence upon the identified portion of the operational entry for the tier further comprises deleting from the logical page a subentry that matches the identified portion of the operational entry for the tier by modifying logical connections among radix nodes of the logical page if the subentry that matches the identified portion of the operational entry for the tier is not comprised in more than one entry of the previously established PBRT; and selecting operation results from the logical pages on the entry path for the operational entry further comprises discarding the deletions from the logical pages not on the entry path for the operational entry.

7. A parallel computer for parallel execution of operations for a previously established partitioned binary radix tree, the parallel computer comprising:

a computer processor, a computer memory operatively coupled to the computer processor, the computer memory having disposed within the computer memory computer program instructions configured to:

receive, in the parallel computer, an operational entry for the previously established PBRT, the previously established PBRT comprising a plurality of logical pages that contain a plurality of entries in the previously established PBRT, each logical page included in a tier of the previously established PBRT and containing one or more subentries represented by a plurality of radix nodes organized as a sub tree on the logical page, each subentry is a portion of an entry that corresponds to the tier of the logical page containing the subentry, each entry in the previously established PBRT is composed of a subentry from each logical page on an entry path for the entry;

process in parallel, on the parallel computer, each logical page in each tier of the previously established PBRT, including:

identifying a portion of the operational entry that corresponds to the tier of the logical page, and performing an operation on the logical page in dependence upon the identified portion of the operational entry for the tier; and select operation results from the logical pages on the entry path for the operational entry.

8. The parallel computer of claim 7 wherein the parallel computer further comprises a plurality of compute nodes, the compute nodes organized into at least one operational group of compute nodes for collective parallel operations on the parallel computer, the parallel computer further comprising computer program instructions configured to:

configure each logical page of the previously established PBRT on a different compute node in the operational group.

9. The parallel computer of claim 7 wherein the parallel computer further comprises a plurality of computer processors and shared computer memory accessible to the plurality of computer processors, the shared computer memory partitioned into a plurality of memory partitions, the parallel computer further comprising computer program instructions configured to:

configure each logical page of the previously established PBRT on a different memory partition; and map each processor to a different memory partition.

10. The parallel computer of claim 7 wherein:

performing an operation on the logical page in dependence upon the identified portion of the operational entry for the tier further comprises searching the logical page for a subentry that matches the identified portion of the operational entry for the tier by traversing the radix nodes of the logical page; and selecting operation results from the logical pages on the entry path for the operational entry further comprises selecting, from the logical pages having a subentry that matches the identified portion of the operational entry, search results from the logical pages on the entry path for the operational entry.

11. The parallel computer of claim 7 wherein:

performing an operation on the logical page in dependence upon the identified portion of the operational entry for the tier further comprises inserting into the logical page a subentry that matches the identified portion of the operational entry for the tier by modifying logical connections among radix nodes of the logical page; and selecting operation results from the logical pages on the entry path for the operational entry further comprises discarding the insertions into the logical pages not on the entry path for the operational entry.

12. The parallel computer of claim 7 wherein:

processing in parallel, on the parallel computer, each logical page in each tier of the previously established PBRT further comprises determining whether a subentry that matches the identified portion of the operational entry for the tier is comprised in more than one entry of the previously established PBRT;

performing an operation on the logical page in dependence upon the identified portion of the operational entry for the tier further comprises deleting from the logical page a subentry that matches the identified portion of the operational entry for the tier by modifying logical connections among radix nodes of the logical page if the subentry that matches the identified portion of the operational entry for the tier is not comprised in more than one entry of the previously established PBRT; and selecting operation results from the logical pages on the entry path for the operational entry further comprises discarding the deletions from the logical pages not on the entry path for the operational entry.

13. A computer program product for parallel execution of operations for a previously established partitioned binary radix tree on a parallel computer, the computer program product:

disposed upon a recordable medium for machine-readable information and comprising computer program instructions configured to:

receive, in the parallel computer, an operational entry for the previously established PBRT, the previously established PBRT comprising a plurality of logical pages that contain a plurality of entries in the previously established PBRT, each logical page included in a tier of the previously established PBRT and containing one or more subentries represented by a plurality of radix nodes organized as a sub tree on the logical page, each subentry is a portion of an entry that corresponds to the tier of the logical page containing the subentry, each entry in the previously established PBRT is composed of a subentry from each logical page on an entry path for the entry;

process in parallel, on the parallel computer, each logical page in each tier of the previously established PBRT, including:

identifying a portion of the operational entry that corresponds to the tier of the logical page, and performing an operation on the logical page in dependence upon the identified portion of the operational entry for the tier; and select operation results from the logical pages on the entry path for the operational entry.

14. The computer program product of claim 13 wherein the parallel computer further comprises a plurality of compute nodes, the compute nodes organized into at least one operational group of compute nodes for collective parallel operations on the parallel computer, the parallel computer further comprising computer program instructions configured to:
configure each logical page of the previously established PBRT on a different compute node in the operational group.

15. The computer program product of claim 13 wherein the parallel computer further comprises a plurality of computer processors and shared computer memory accessible to the plurality of computer processors, the shared computer memory partitioned into a plurality of memory partitions, the parallel computer further comprising computer program instructions configured to:
configure each logical page of the previously established PBRT on a different memory partition; and
map each processor to a different memory partition.

16. The computer program product of claim 13 wherein:
performing an operation on the logical page in dependence upon the identified portion of the operational entry for the tier further comprises searching the logical page for a subentry that matches the identified portion of the operational entry for the tier by traversing the radix nodes of the logical page; and
selecting operation results from the logical pages on the entry path for the operational entry further comprises selecting, from the logical pages having a subentry that matches the identified portion of the operational entry, search results from the logical pages on the entry path for the operational entry.

17. The computer program product of claim 13 wherein:
performing an operation on the logical page in dependence upon the identified portion of the operational entry for the tier further comprises inserting into the logical page a subentry that matches the identified portion of the operational entry for the tier by modifying logical connections among radix nodes of the logical page; and
selecting operation results from the logical pages on the entry path for the operational entry further comprises discarding the insertions into the logical pages not on the entry path for the operational entry.

18. The computer program product of claim 13 wherein:
processing in parallel, on the parallel computer, each logical page in each tier of the previously established PBRT further comprises determining whether a subentry that matches the identified portion of the operational entry for the tier is comprised in more than one entry of the previously established PBRT;
performing an operation on the logical page in dependence upon the identified portion of the operational entry for the tier further comprises deleting from the logical page a subentry that matches the identified portion of the operational entry for the tier by modifying logical connections among radix nodes of the logical page if the subentry that matches the identified portion of the operational entry for the tier is not comprised in more than one entry of the previously established PBRT; and
selecting operation results from the logical pages on the entry path for the operational entry further comprises discarding the deletions from the logical pages not on the entry path for the operational entry.

* * * * *